(12) United States Patent
Imamura

(10) Patent No.: US 8,711,215 B2
(45) Date of Patent: Apr. 29, 2014

(54) IMAGING DEVICE AND IMAGING METHOD

(75) Inventor: Norihiro Imamura, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/811,154

(22) PCT Filed: Apr. 19, 2011

(86) PCT No.: PCT/JP2011/002294
§ 371 (c)(1),
(2), (4) Date: Jan. 18, 2013

(87) PCT Pub. No.: WO2012/017577
PCT Pub. Date: Feb. 9, 2012

(65) Prior Publication Data
US 2013/0120564 A1 May 16, 2013

(30) Foreign Application Priority Data

Aug. 6, 2010 (JP) ................................. 2010-177114

(51) Int. Cl.
*G01C 3/08* (2006.01)
*G01C 3/32* (2006.01)

(52) U.S. Cl.
CPC ... *G01C 3/08* (2013.01); *G01C 3/32* (2013.01)
USPC ......................................... 348/135; 348/349

(58) Field of Classification Search
None
See application file for complete search history.

(56) References Cited

U.S. PATENT DOCUMENTS

| 5,576,975 | A  | * | 11/1996 | Sasaki et al. .................. 702/158 |
| 7,098,055 | B2 | * | 8/2006  | Noguchi et al. ................ 438/18  |
| 7,233,359 | B2 | * | 6/2007  | Suda ............................. 348/349 |
| 7,242,478 | B1 | * | 7/2007  | Dombrowski et al. ....... 356/419 |

(Continued)

FOREIGN PATENT DOCUMENTS

| JP | 62-247314 A | 10/1987 |
| JP | 05-302831 A | 11/1993 |

(Continued)

OTHER PUBLICATIONS

International Search Report for corresponding International Application No. PCT/JP2011/002294 mailed Jun. 21, 2011.

(Continued)

*Primary Examiner* — Jay Patel
*Assistant Examiner* — Reza Aghevli
(74) *Attorney, Agent, or Firm* — Renner, Otto, Boisselle & Sklar, LLP

(57) ABSTRACT

Provided is an imaging device including: a lens optical system L including at least an optical plane area D1 and an optical plane area D2, the optical plane area D2 having an optical property that causes a focusing property of the optical plane area D2 to differ from a focusing property of the optical plane area D1 due to a light beam that has passed through the optical plane area D1; an imaging element N including at least a plurality of pixels P1 and a plurality of pixels P2 which allow light that has passed through the lens optical system L to enter; and an array-shaped optical element K that is arranged between the lens optical system L and the imaging element N and is configured to cause light that has passed through the optical plane area D1 to enter the plurality of pixels P1 and to cause light that has passed through the optical plane area D2 to enter the plurality of pixels P2.

36 Claims, 26 Drawing Sheets

(56) References Cited

U.S. PATENT DOCUMENTS

| | | | |
|---|---|---|---|
| 7,287,854 B2* | 10/2007 | Suzuki | 351/206 |
| 7,355,682 B2* | 4/2008 | Bani-Hashemi | 356/3.1 |
| 7,414,664 B2* | 8/2008 | Suda | 348/341 |
| 7,433,042 B1* | 10/2008 | Cavanaugh et al. | 356/419 |
| 7,471,889 B2* | 12/2008 | Suda | 396/114 |
| 7,589,825 B2* | 9/2009 | Orchard et al. | 356/4.03 |
| 7,627,196 B2* | 12/2009 | Suzuki et al. | 382/286 |
| 7,656,509 B2* | 2/2010 | Haddock et al. | 356/4.07 |
| 7,742,693 B2* | 6/2010 | Kobayashi | 396/91 |
| 7,756,408 B2* | 7/2010 | Ito et al. | 396/123 |
| 8,130,310 B2* | 3/2012 | Yamamoto et al. | 348/362 |
| 8,330,878 B2* | 12/2012 | Raines et al. | 348/838 |
| 8,456,565 B2* | 6/2013 | Hayasaka et al. | 348/340 |
| 2001/0015763 A1* | 8/2001 | Miwa et al. | 348/345 |
| 2004/0125230 A1 | 7/2004 | Suda | |
| 2006/0030059 A1 | 2/2006 | Noguchi et al. | |
| 2006/0082726 A1 | 4/2006 | Suzuki | |
| 2009/0027542 A1 | 1/2009 | Yamamoto et al. | |
| 2009/0129767 A1* | 5/2009 | Son et al. | 396/127 |
| 2010/0020306 A1* | 1/2010 | Hall | 356/5.01 |
| 2010/0030380 A1* | 2/2010 | Shah et al. | 700/258 |
| 2010/0110179 A1* | 5/2010 | Zalevsky et al. | 348/135 |
| 2010/0149546 A1* | 6/2010 | Kobayashi et al. | 356/511 |
| 2010/0195087 A1* | 8/2010 | Ossig et al. | 356/5.01 |
| 2010/0283863 A1 | 11/2010 | Yamamoto | |
| 2010/0283884 A1 | 11/2010 | Hayasaka et al. | |

FOREIGN PATENT DOCUMENTS

| | | |
|---|---|---|
| JP | 07-035545 A | 2/1995 |
| JP | 09-130661 A | 5/1997 |
| JP | 2963990 B | 8/1999 |
| JP | 2000-152281 A | 5/2000 |
| JP | 3110095 B | 9/2000 |
| JP | 2001-227914 A | 8/2001 |
| JP | 2003-279307 A | 10/2003 |
| JP | 2004-191893 A | 7/2004 |
| JP | 2006-184065 A | 7/2006 |
| JP | 2006-184844 A | 7/2006 |
| JP | 2006-330007 A | 12/2006 |
| JP | 2009-198376 A | 9/2009 |
| JP | 2009-222449 A | 10/2009 |
| JP | 2009-288042 A | 12/2009 |
| JP | 2010-117593 A | 5/2010 |
| JP | 2010-127723 A | 6/2010 |

OTHER PUBLICATIONS

Form PCT/IPEA/408 for corresponding International Application No. PCT/JP2011/002294 dated Dec. 13, 2011.

International Preliminary Report on Patentability for corresponding International Application No. PCT/JP2011/002294 dated Jul. 17, 2012.

Tu et al., "Depth and Focused Image Recovery from Defocused Images for Cameras Operating in Macro Mode", Proceedings of the SPIE, vol. 6762, pp. 676203 (2007) (Two-and-Three Dimensional Methods for Inspection and Metrology V. Edited by Huang, Peisen S.).

* cited by examiner

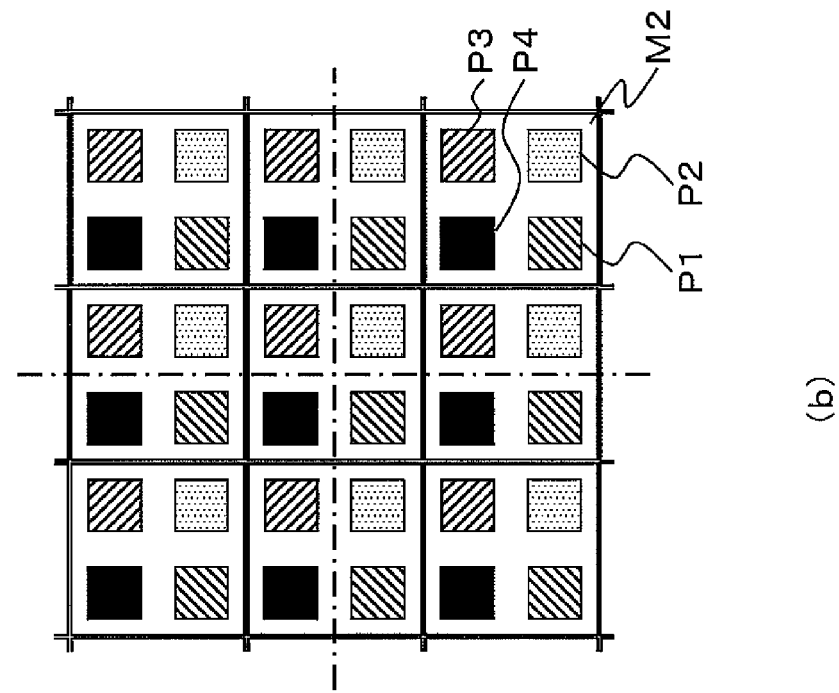
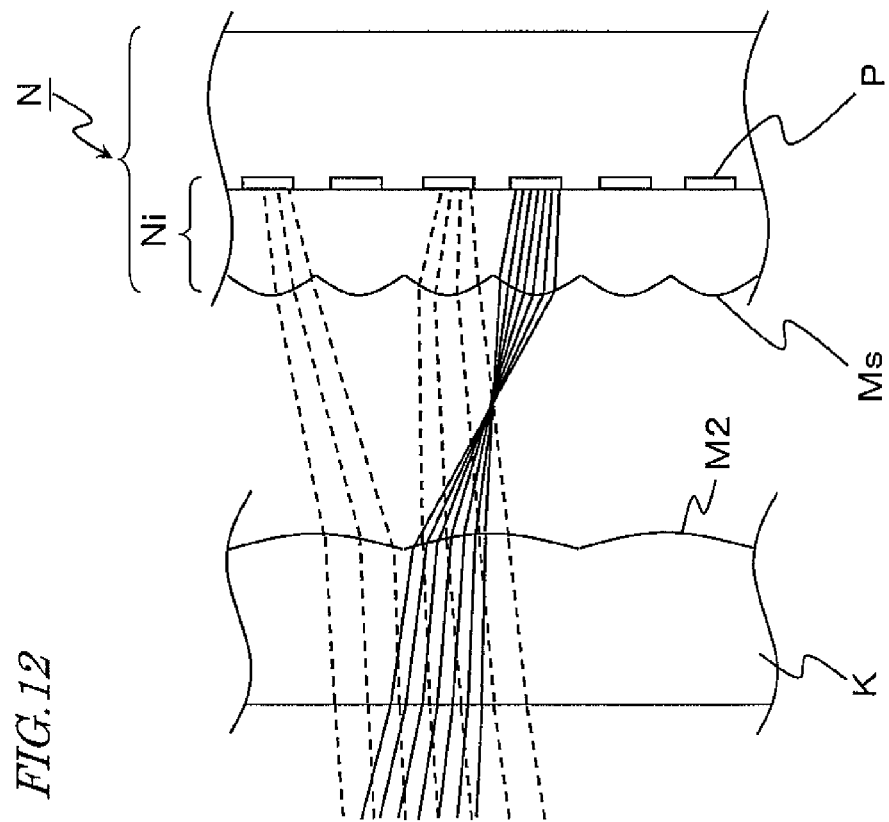
FIG.12

FIG.20

|  | WHOLE AREA | Pa | Pc |
|---|---|---|---|
| 1000mm | | | |
| 2000mm | | | |
| 4000mm | | | |

FIG.23
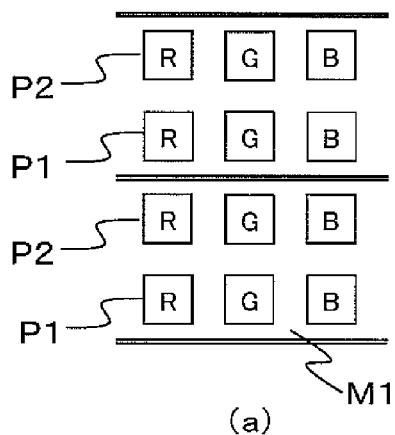
(a)
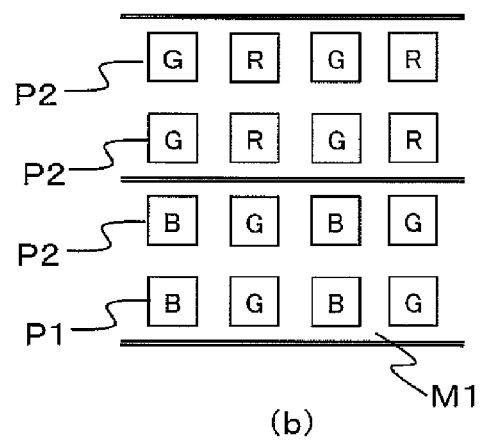
(b)
FIG.24
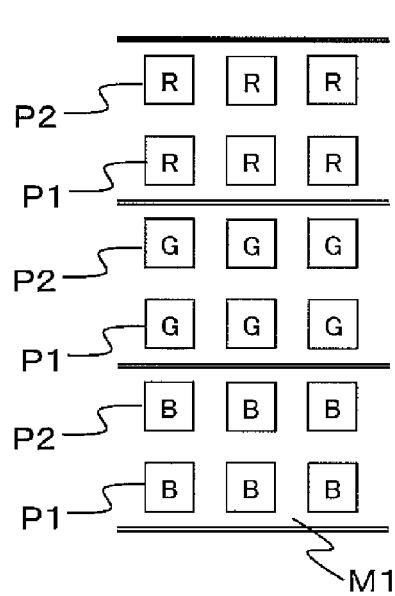
(a)
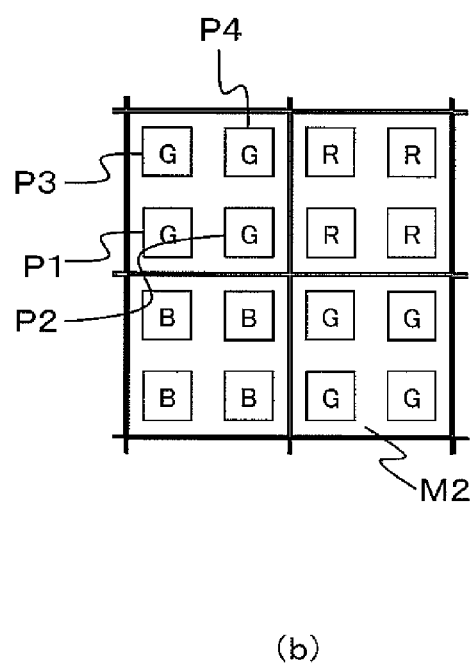
(b)

FIG.29
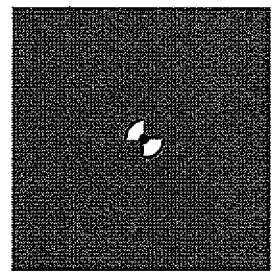
(a1)
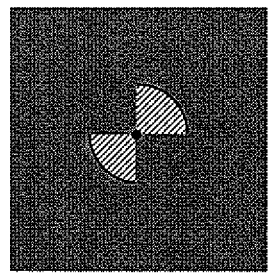
(a2)
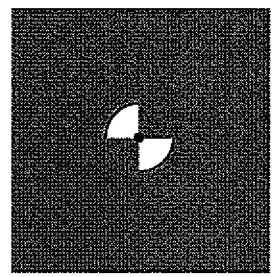
(b1)
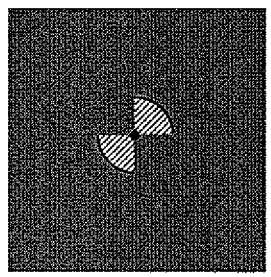
(b2)
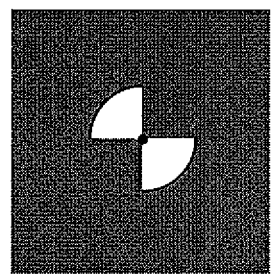
(c1)
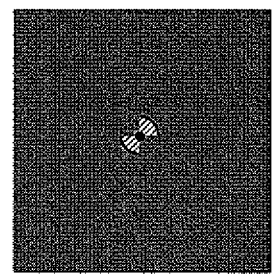
(c2)

FIG.31
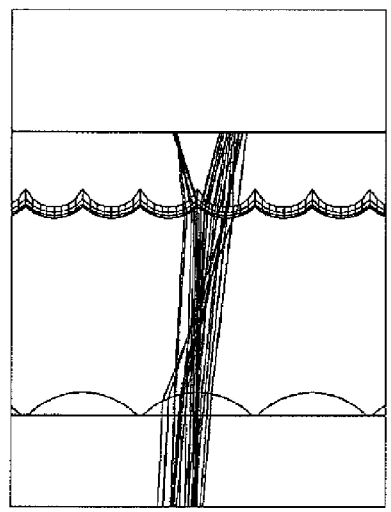
(a3)
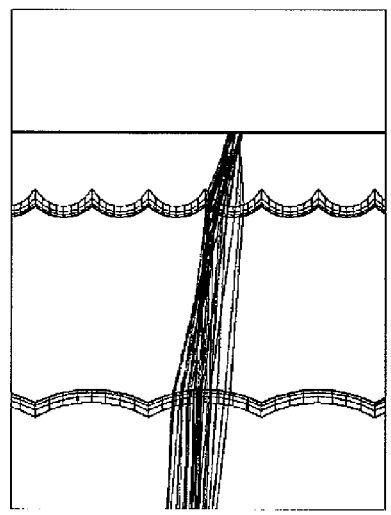
(b3)
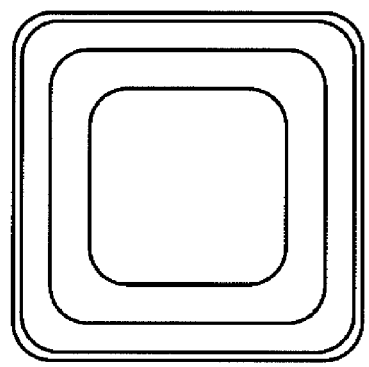
(a2)
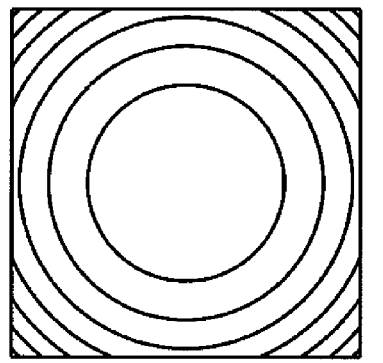
(b2)
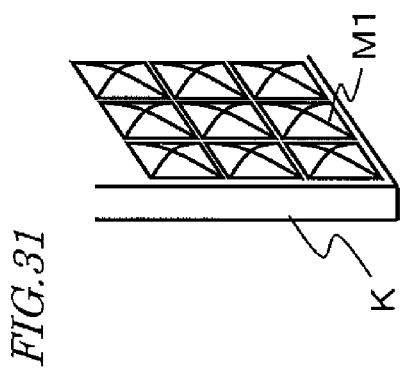
(a1)
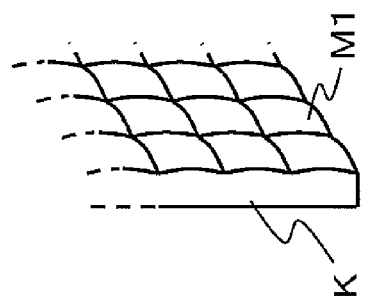
(b1)

IMAGING DEVICE AND IMAGING METHOD

TECHNICAL FIELD

The present invention relates to an imaging device such as a camera and an imaging method using the imaging device.

BACKGROUND ART

In recent years, a distance measurement device for measuring a distance to a subject (object to which a distance is to be measured) by a parallax between a plurality of imaging optical systems has been used in an inter-vehicle distance measurement system, a camera auto-focus system, and a three-dimensional shape measurement system.

In this type of measurement device, an image is formed in each imaging area by a pair of imaging optical systems respectively arranged on left and right sides or one above the other, and the distance to the subject is detected from a parallax between the images by using triangulation.

On the other hand, as a method of measuring the distance to the subject from a single imaging optical system, a depth from defocus (DFD) method has been known. In the DFD method, the distance is calculated from an analysis of blurring amount of an acquired image. However, it is hard to determine whether the detection result is a pattern of the subject itself or a blurring due to the distance to the subject with a single image, and therefore, a method of estimating the distance from a plurality of images has been employed (see Patent Document No. 1 and Non-patent Document No. 1).

CITATION LIST

Patent Literature

Patent Document No. 1: Japanese Patent Publication No. 3110095

Non-Patent Literature

Non-patent Document No. 1: Xue Tu, Youn-sik Kang and Murali Subbarao Two- and Three-Dimensional Methods for Inspection and Metrology V. Edited by Huang, Peisen. S. Proceedings of the SPIE, Volume 6762, pp. 676203 (2007).

SUMMARY OF INVENTION

Technical Problem

The configuration employing a plurality of imaging optical systems increases the imaging device in size and increases the cost. Further, it is difficult to manufacture the imaging device because it is required to match properties of the plurality of imaging optical systems and to keep parallel optical axes of the two imaging optical systems in a highly accurate manner. In addition, a calibration process to obtain camera parameters is required, and hence a large amount of man-hour is required.

With the DFD method disclosed in Patent Document No. 1 and Non-patent Document No. 1, the distance to the subject can be calculated by using a single imaging optical system. However, in the method disclosed in Patent Document No. 1 and Non-patent Document No. 1, it is required to acquire a plurality of images in a time division manner by changing a distance to a focusing subject (focusing distance). When this type of method is applied to a moving image, there occurs a problem of degrading the distance measurement accuracy because there is a shift between images due to a time difference in recording the images.

Further, in Patent Document. No. 1, an imaging device has been disclosed, which is configured to measure the distance to the subject through a single imaging operation by dividing an optical path with a prism and imaging with two imaging planes having different back focuses from each other. However, in this type of method, two imaging planes are required, and hence there occurs a problem that the size of the imaging device is increased and the cost is considerably increased.

The present invention has been made in view of the above-mentioned problems, and a principal object of the present invention is to provide an imaging device and an imaging method capable of measuring the distance to the subject through a single imaging operation by using a single imaging optical system.

Solution to Problem

According the present invention, there is provided an imaging device, including: a lens optical system including at least a first area and a second area, the second area having an optical property that causes a focusing property of the second area to differ from a focusing property of the first area due to a light beam that has passed through the first area; an imaging element including at least a plurality of first pixels and a plurality of second pixels which allow light that has passed through the lens optical system to enter; and an array-shaped optical element that is arranged between the lens optical system and the imaging element and is configured to cause light that has passed through the first area to enter the plurality of first pixels and to cause light that has passed through the second area to enter the plurality of second pixels.

According to the present invention, there is provided an imaging system including: the imaging device according to the present invention; and a signal processing device that calculates a distance to a subject by using brightness information of a first image obtained from the plurality of first pixels and a second image obtained from the plurality of second pixels in the imaging device.

According to the present invention, there is provided an imaging method using an imaging device, the imaging device including: a lens optical system including at least a first area and a second area, the second area having an optical property that causes a focusing property of the second area to differ from a focusing property of the first area due to a light beam that has passed through the first area; an imaging element including at least a plurality of first pixels and a plurality of second pixels which allow light that has passed through the lens optical system to enter; and an array-shaped optical element that is arranged between the lens optical system and the imaging element, the imaging method including: causing, by the array-shaped optical element, light that has passed through the first area to enter the plurality of first pixels and light that has passed through the second area to enter the plurality of second pixels; and calculating a distance to a subject by using brightness information of a first image obtained from the plurality of first pixels and a second image obtained from the plurality of second pixels.

Advantageous Effects of Invention

According to the present invention, the distance to the subject can be measured through a single imaging operation by using a single imaging optical system. In the present invention, unlike the imaging device employing a plurality of imaging optical systems, it is not required to match properties and positions of the plurality of imaging optical systems. In addition, when a moving image is recorded with the imaging device according to the present invention, even if there is a change of a position of the subject due to an elapse of time, the distance to the subject can be measured in an accurate manner.

BRIEF DESCRIPTION OF DRAWINGS

FIG. 12(a) is an enlarged diagram of the array-shaped optical element K and an imaging element N according to the second embodiment of the present invention, and FIG. 12(b) is a diagram illustrating a positional relationship between the array-shaped optical element K and pixels on the imaging element N.

FIG. 20 is a diagram illustrating a point-image intensity profile for each subject distance according to the third embodiment of the present invention.

FIGS. 23(a) and 23(b) are diagrams illustrating a positional relationship between an array-shaped optical element K and pixels on an imaging element N according to a sixth embodiment of the present invention.

FIGS. 24(a) and 24(b) are diagrams illustrating a positional relationship between an array-shaped optical element K and pixels on an imaging element N according to a seventh embodiment of the present invention.

FIGS. 28(a2), 28(b2), and 28(c2) are diagrams schematically illustrating image information of point images obtained by light of an object point O that has passed through the optical plane area D1 and arrived at pixels of an odd row via a lenticular lens. FIGS. 28(a3), 28(b3), and 28(c3) are diagrams schematically illustrating image information of point images obtained by light of the object point O that has passed through the optical plane area D2 and arrived at pixels of an even row via the lenticular lens.

FIGS. 29(a1), 29(b1), and 29(c1) are diagrams schematically illustrating image information of point images obtained by adding pixel values of pixels of odd row and odd column and pixels of even row and even column. FIGS. 29(a2), 29(b2), and 29(c2) are diagrams schematically illustrating image information of point images obtained by adding pixel values of pixels of even row and odd column and pixels of odd row and even column.

FIG. 31(a1) is a perspective view of a microlens array having a rotational asymmetric shape with respect to an optical axis. FIG. 31(a2) is a diagram illustrating a contour of the microlens array illustrated in FIG. 31(a1). FIG. 31(a3) is a diagram illustrating a result of a light-beam tracking simulation when the microlens illustrated in FIGS. 31(a1) and 31(a2) is applied to the array-shaped optical element according to the present invention. FIG. 31(b1) is a perspective view of a microlens array having a rotational symmetric shape with respect to the optical axis. FIG. 31(b2) is a diagram illustrating a contour of the microlens array illustrated in FIG. 31(b1). FIG. 31(b3) is a diagram illustrating a result of the light-beam tracking simulation when the microlens illustrated in FIGS. 31(b1) and 31(b2) is applied to the array-shaped optical element according to the embodiments of the present invention.

DESCRIPTION OF EMBODIMENTS

In the following, an imaging device according to exemplary embodiments of the present invention is described with reference to the accompanying drawings.

(First Embodiment)

Figure 1:
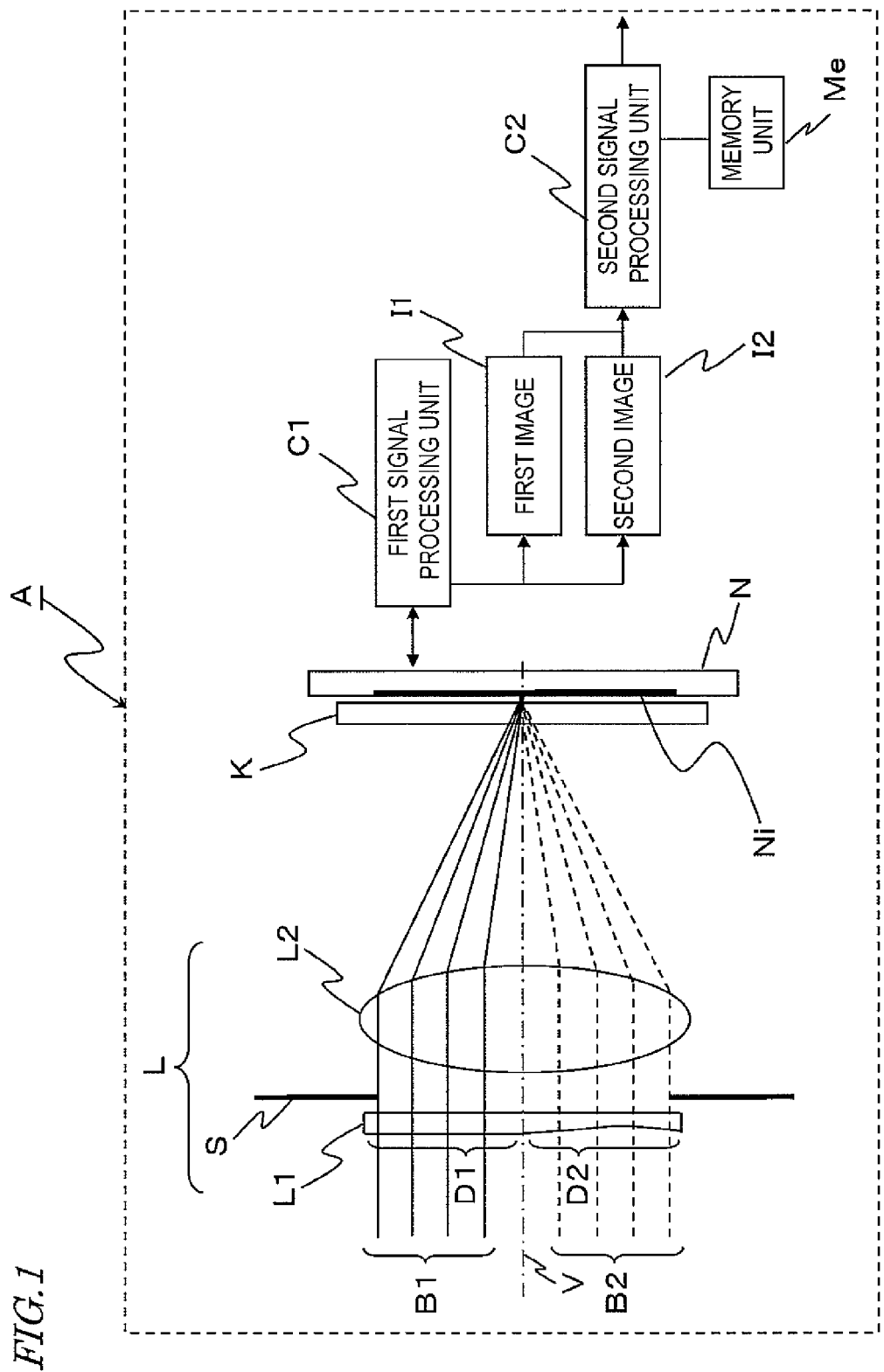
FIG. 1 is a schematic diagram illustrating an imaging device A according to a first embodiment of the present invention.

FIG. 1 is a schematic diagram illustrating an imaging device A according to a first embodiment of the present invention. The imaging device A according to this embodiment includes a lens optical system L having an optical axis V, an array-shaped optical element K arranged near a focal point of the lens optical system L, an imaging element N, a first signal processing unit C1, a second signal processing unit C2, and a memory unit Me.

The lens optical system L includes an optical element L1 which has two optical plane areas D1 and D2 having optical properties that cause focusing properties to differ from each other and allows light beams B1 and B2 from a subject (not shown) to enter therethrough, a stop S which allows light that has passed through the optical element L1 to enter therethrough, and a lens L2 which allows the light that has passed through the stop S to enter therethrough. It is preferred to arrange the optical element L1 near the stop S.

Figure 4:
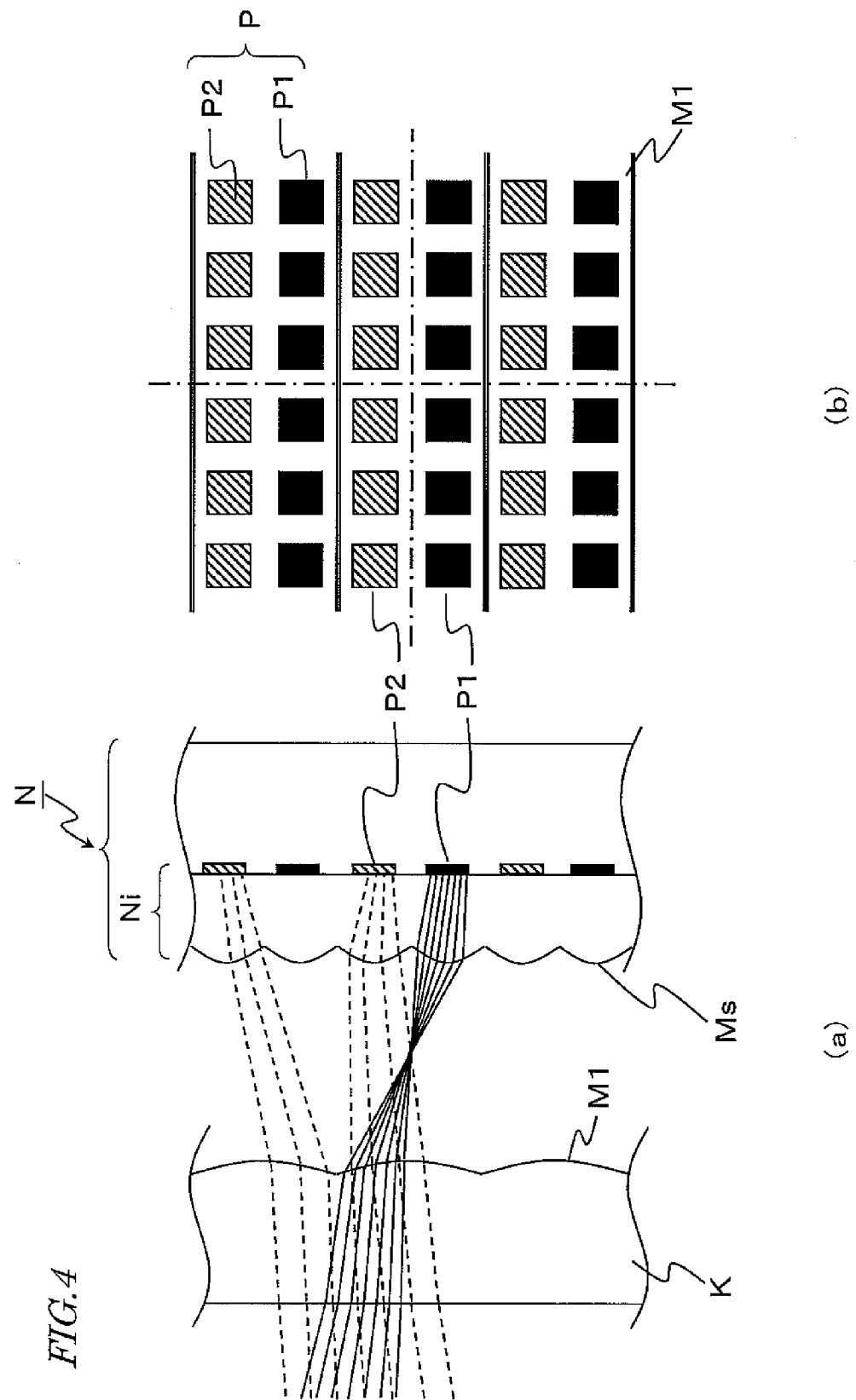
FIG. 4(a) is an enlarged diagram of the array-shaped optical element K and an imaging element N illustrated in FIG. 1.
FIG. 4(b) is a diagram illustrating a positional relationship between the array-shaped optical element K and pixels on the imaging element N.

In this embodiment, the light that has passed through the two optical plane areas D1 and D2 enters the array-shaped optical element K after passing through the lens L2. The array-shaped optical element K causes the light that has passed through the optical plane area D1 to enter pixels P1 (see, for example, FIG. 4) of the imaging element N and causes the light that has passed through the optical plane area D2 to enter pixels P2 of the imaging element N. The first signal processing unit C1 outputs a first image I1 obtained at the pixels P1 and a second image I2 obtained at the pixels P2. The optical properties of the two optical plane areas D1 and D2 differ from each other, and hence the sharpnesses (values calculated by using a brightness) of the two images, that is, the first and second images I1 and I2, differ depending on the subject distance. A correlation between the sharpness of the light that has passed through each of the optical plane areas D1 and D2 and the subject distance is stored in the memory unit Me. The second signal processing unit C2 can obtain the distance to the subject based on the sharpnesses of the first and second images I1 and I2 and the correlation.

Figure 2:
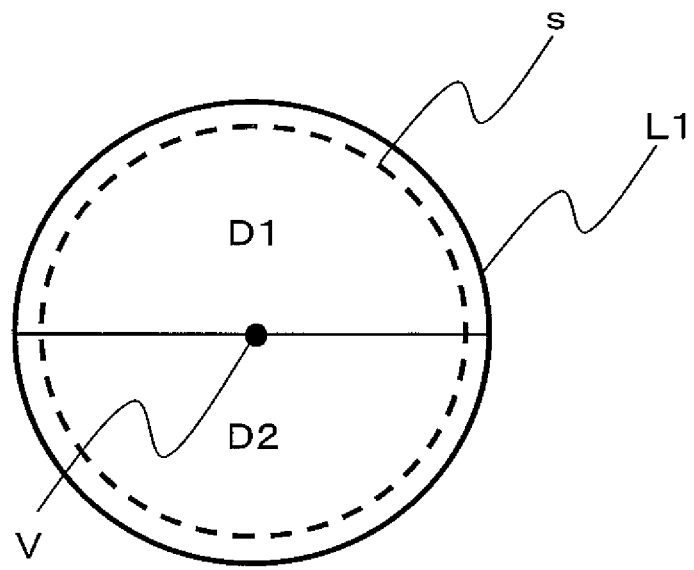
FIG. 2 is a front view of an optical element L1 according to the first embodiment of the present invention viewed from a subject side.

FIG. 2 is a front view of the optical element L1 viewed from the subject side. The optical plane areas D1 and D2 on the optical element L1 are divided as two up and down areas on a plane perpendicular to the optical axis V with the optical axis V as a boundary center. In FIG. 2, a dashed line indicates a position of the stop S. In FIG. 1, the light beam B1 is a light beam that passes through the optical plane area D1 on the optical element L1, and the light beam B2 is a light beam that passes through the optical plane area D2 on the optical element L1. The light beams B1 and B2 sequentially pass through the optical element L1, the stop S, the lens L2, and the array-shaped optical element K in this order, and arrive at an imaging plane Ni on the imaging element N (see, for example, FIG. 4).

Figure 3:
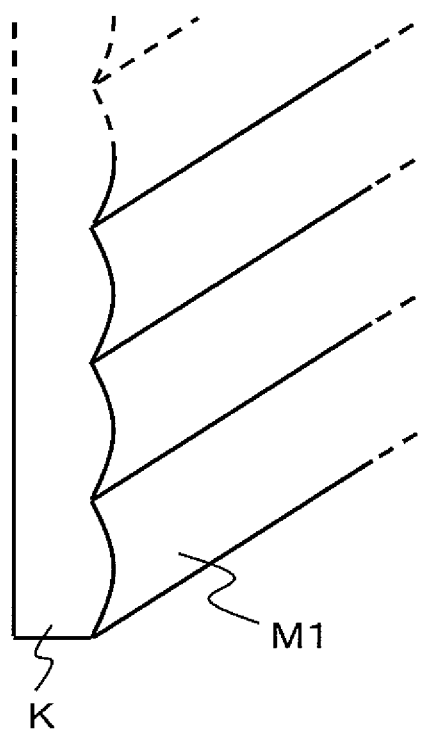
FIG. 3 is a perspective view of an array-shaped optical element K according to the first embodiment of the present invention.

FIG. 3 is a perspective view of the array-shaped optical element K. On a surface of the array-shaped optical element K on the imaging element N side, a plurality of optical elements M1 elongated in the lateral direction is arranged in the longitudinal direction on the plane perpendicular to the optical axis V. A cross section of each of the optical elements M1 (cross section in the longitudinal direction) has an arc shape protruding toward the imaging element N side. In this manner, the array-shaped optical element K has a configuration of a lenticular lens.

As illustrated in FIG. 1, the array-shaped optical element K is arranged near the focal point of the lens optical system L, at a position apart from the imaging plane Ni by a predetermined distance. In practice, although the optical property of the optical element L1 has an influence on the focusing property of the lens optical system L as a whole, it suffices that the position for arranging the array-shaped optical element K be determined, for example, with reference to the focal point of the lens L2. In this embodiment, "the focusing properties differ" means that at least one of properties that contribute to the focusing of light in the optical system differs, and specifically, it means that a focal distance, a distance to a subject on the focus, a distance range in which the sharpness becomes equal to or larger than a predetermined value, or the like differs. By causing the optical properties to differ from each other by adjusting curvature radiuses, aspheric coefficients, or refractive indexes of the optical plane area D1 and D2, it is possible to cause the focusing properties by the light beams that have passed through the areas to differ from each other.

FIG. 4(a) is an enlarged diagram of the array-shaped optical element K and the imaging element N illustrated in FIG. 1, and FIG. 4(b) is a diagram illustrating a positional relationship between the array-shaped optical element K and pixels on the imaging element N. The array-shaped optical element K is arranged so that the surface on which the optical elements M1 are formed faces the imaging plane Ni side. On the imaging plane Ni, pixels P are arranged in a matrix shape. The pixels P can be divided into the pixels P1 and the pixels P2. The pixels P1 and the pixels P2 are respectively arranged in the lateral direction (row direction) in a row. In the longitudinal direction (column direction), the pixels P1 and P2 are arranged in an alternate manner. The array-shaped optical element K is arranged so that one of the optical elements M1 corresponds to pixels of two rows including the pixels P1 of one row and the pixels P2 of one row on the imaging plane Ni. On the imaging plane Ni, a microlens Ms is provided to cover surfaces of the pixels P1 and P2.

The array-shaped optical element K is designed so that a majority of the light beam B1 (light beam B1 indicated by a solid line in FIG. 1) that has passed through the optical plane area D1 on the optical element L1 (see FIGS. 1 and 2) arrives at the pixels P1 on the imaging plane Ni and a majority of the light beam (light beam B2 indicated by a dashed line in FIG. 1) that has passed through the optical plane area D2 arrives at the pixels P2 on the imaging plane Ni. Specifically, this configuration can be achieved by setting parameters such as a refractive index of the array-shaped optical element K, a distance from the imaging plane Ni, and curvature radiuses of the surface of the optical elements M1 in an appropriate manner.

By the first signal processing unit C1 illustrated in FIG. 1, the first image I1 formed only by the pixel P1 and the second image I2 formed only by the pixel P2 are output. By the second signal processing unit C2, a distance measurement operation is performed by using brightness information represented by a difference of brightness values (sharpness) between adjacent pixels in the first image I1 and the second image I2.

The first image I1 and the second image I2 are images obtained by the light beams B1 and B2, respectively, which have respectively passed through the optical plane areas D1 and D2 having optical properties that cause the focusing properties to differ from each other. That is, the imaging device A can acquire a plurality of images through a single imaging operation by using the optical system L having a plurality of focusing properties. In this embodiment, the subject distance can be obtained by using the first image I1 and the second image I2.

The stop S is an area through which the light beam of the whole angle of view passes. Therefore, by inserting a surface having an optical property for controlling the focusing property near the stop S, it is possible to control the focusing property of the light beam of the whole angle of view in the same manner. That is, in this embodiment, it is preferred to provide the optical element L1 near the stop S. By arranging the optical plane areas D1 and D2 having the optical properties that cause the focusing properties to differ from each other near the stop S, it is possible to apply focusing properties in accordance with the number of divided areas to the light beam.

In FIG. 1, the optical element L1 is provided at a position where the light that has passed through the optical element L1 enters the stop S in a direct manner (without any optical member therebetween). The optical element L1 can be provided on the imaging element N side of the stop S. In this case, the optical element L1 is provided between the stop S and the lens L2, and it is preferred that the light that has passed through the stop S enter the optical element L1 in a direct manner (without any optical member therebetween). In the case of an image-side telecentric optical system, an incident angle of a light beam at a focal point of the optical system is uniquely determined by a position and an angle of view of the light beam passing through the stop S. Further, the array-shaped optical element K has a function of distributing an exit direction in accordance with the incident angle of the light beam. Therefore, it is possible to distribute the light beam to the pixels on the imaging plane Ni to correspond to the optical plane areas D1 and D2 that are divided near the stop S.

A method of obtaining the subject distance is described in detail below.

Figure 5:
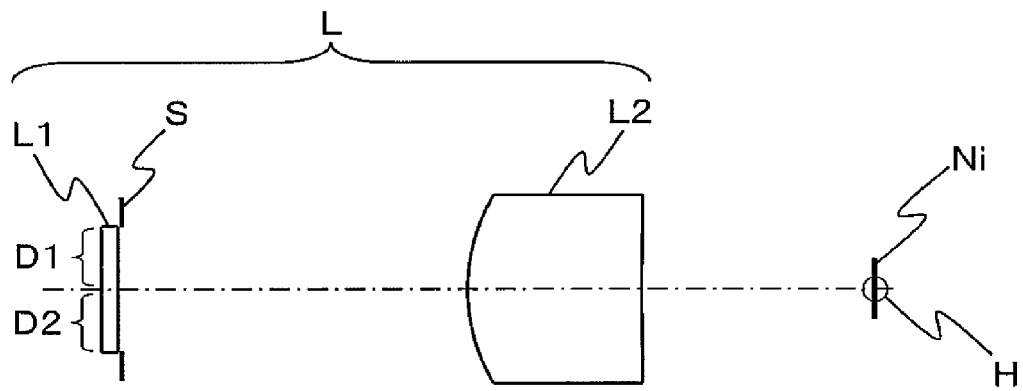
FIG. 5 is a cross-sectional view of the imaging device A according to the first embodiment of the present invention.

FIG. 5 is a cross-sectional view of the imaging device A according to the first embodiment. In FIG. 5, the same components as those illustrated in FIG. 1 are assigned with the same reference symbols as in FIG. 1. Although the array-shaped optical element K (illustrated in, for example, FIG. 1) is omitted from drawing in FIG. 5, in practice, the array-shaped optical element K is included in an area H in FIG. 5. The area H has the configuration illustrated in FIG. 4(a).

Table 1 and Table 2 show design data of the optical system of the imaging device A illustrated in FIG. 5. In Table 1 and Table 2, Ri is paraxial curvature radius of each plane (mm), di is plane center interval of each plane (mm), nd is refractive index of a d line of a lens or a filter, and vd is Abbe's number of the d line of each optical element. The aspheric shape is represented by (Equation 1), where x is distance in the optical axis direction from a tangential plane of a plane vertex, h is height from the optical axis, r is paraxial curvature radius, k is conical constant, and $A_m$ (m=4, 6, 8, 10) is m-th order aspheric coefficient.

$$x = \frac{\frac{1}{r}h^2}{1+\sqrt{1-(1+k)\left(\frac{1}{r}\right)^2 h^2}} + A_4 h^4 + A_6 h^6 + A_8 h^8 + A_{10} h^{10}$$ [Equation 1]

TABLE 1

Lens data
Focal length = 10 mm, F value = 2.8, Wavelength 550 nm
Angle of view 2ω = 10°, Effective imaging circle diameter = φ 1.75 mm

| Surface Number | Ri | di | nd | vd |
|---|---|---|---|---|
| Object | ∞ | 4,000 | — | — |
| R1 plane | Area D1 ∞ | 0.5 | 1.5253 | 56.0 |
|  | Area D2 2,000 |  |  |  |
| R2 plane | ∞ | 0.1 | — | — |
| Stop | ∞ | 10 | — | — |
| R3 plane | 5.332237 | 5 | 1.5253 | 56.0 |
| R4 plane | −319.8501 | 6.75 | — | — |
| Image plane | ∞ | — | — | — |

TABLE 2

Aspheric coefficient

|  |  | k | A4 | A6 | A8 | A10 |
|---|---|---|---|---|---|---|
| R1 plane | Area D1 | 0 | 0 | 0 | 0 | 0 |
|  | Area D2 | 0 | 0.000064653 | 0.00018193 | 0 | 0 |
| R3 plane |  | −0.296987 | 0.000421138 | −0.000059237 | 0.000016321 | −0.000001294 |
| R4 plane |  | 0 | 0.00274336 | −0.000566209 | 0.000216386 | −0.000026416 |

In this design example, among the planes on the subject side in the optical element L1, the optical plane area D1 is a planar surface, and the optical plane area D2 is an optical plane that generates a substantially constant point-image intensity profile in a predetermined range near the focal point of the lens optical system L.

Figure 6:
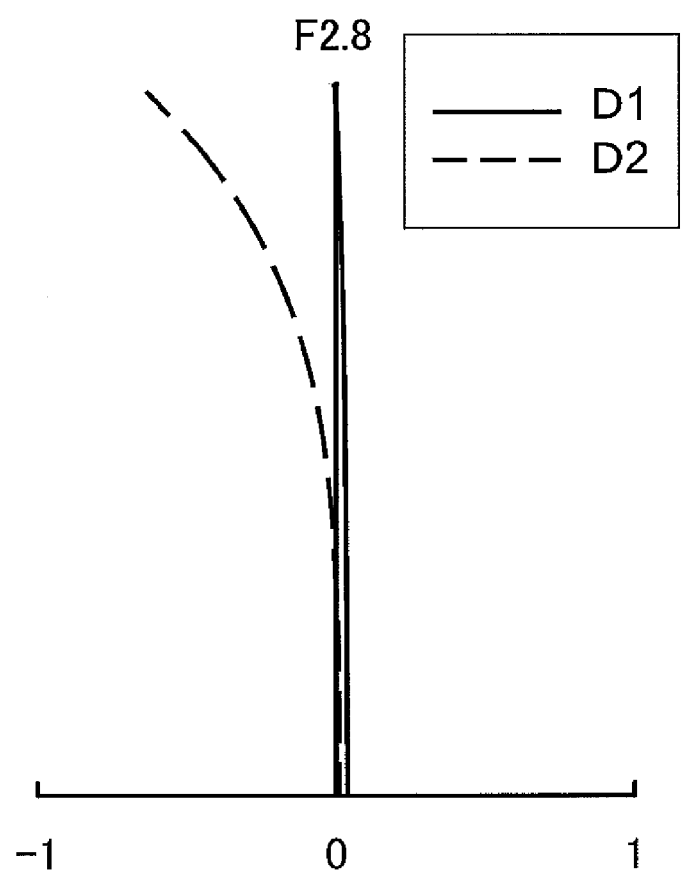
FIG. 6 is a graph showing a spherical aberration caused by light beams that have passed through an optical plane area D1 and an optical plane area D2 according to the first embodiment of the present invention.

FIG. 6 is a graph showing a spherical aberration caused by the light beams that have passed through the optical plane areas D1 and D2. While the optical plane area D1 is designed so that the spherical aberration caused by the light beam that passes through the optical plane area D1 is decreased, the optical plane area D2 is designed so that the spherical aberration is caused by the light beam that passes through the optical plane area D2. By adjusting the property of the spherical aberration caused by the optical plane area D2, the point-image intensity profile of an image caused by the light that has passed through the optical plane area D2 can be kept substantially constant in the predetermined range near the focal point of the lens optical system L. That is, the point-image intensity profile can be kept substantially constant even when the subject distance is changed.

Figure 7:
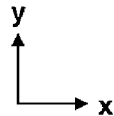
FIG. 7 is a diagram illustrating a point-image intensity profile for each subject distance according to the first embodiment of the present invention.

FIG. 7 is a diagram illustrating the point-image intensity profile for each subject distance. The point-image intensity profile illustrated in FIG. 7 is obtained by a simulation with a pixel pitch on the imaging element N illustrated in FIG. 4 set to 6 μm and a pitch of the optical elements M1 of the array-shaped optical element K set to 12 μm. The left column of FIG. 7 is the point-image intensity profile of the whole pixels. The center column is the point-image intensity profile obtained by extracting only the point-image intensity profile of the pixel P1 and masking the point-image intensity profile of the pixel P2 at zero level. That is, the center column is the point-image intensity profile formed by the light beam that has passed through the optical plane area D1. The right column is the point-image intensity profile obtained by extracting only the point-image intensity profile of the pixel P2 and masking the point-image intensity profile of the pixel P1 at zero level. That is, the right column is the point-image intensity profile formed by the light beam that has passed through the optical plane area D2. It is found that the point-image intensity profile of the pixel P2 is substantially constant even when the subject distance is changed, and the point-image intensity profile of the pixel P1 is decreased in size of the point image as the subject distance increases.

As the size of the point image decreases, the sharpness of the image increases, and therefore, a graph of a relationship between the subject distance and the sharpness provides a relationship shown in FIG. 8(a). In the graph of FIG. 8(a), a sharpness G1 indicates a sharpness of a predetermined area of an image generated only by the pixels P1, and a sharpness G2 indicates a sharpness of a predetermined area of an image generated only by the pixels P2. The sharpness can be obtained based on a difference of a brightness value between adjacent pixels in an image block of a predetermined size. Alternatively, the sharpness can be obtained based on frequency spectra obtained by performing a Fourier transform on a brightness profile of an image block of a predetermined size.

When obtaining a sharpness E in a block having a predetermined size based on a difference of the brightness value between adjacent pixels, for example, (Equation 2) is used.

$$E = \sum_i \sum_j \sqrt{(\Delta x_{i,j})^2 + (k\Delta y_{i,j})^2}$$ [Equation 2]

In (Equation 2), $\Delta x_{i,j}$ is difference between a brightness value of a pixel at coordinates (i, j) in the image block of the predetermined size and a brightness value of a pixel at coordinates (i+1, j), $\Delta y_{i,j}$ is difference between a brightness value of a pixel at coordinates (i, j) in the image block of the predetermined size and a brightness value of a pixel at coordinates (i, j+2), and k is a coefficient. The reason why the brightness value of $\Delta y_{i,j}$ in the y direction is calculated by using a coordinate j and a coordinate j+2 is because the brightness information in the longitudinal direction (y direction) is formed once every other pixel in the image obtained at each of the pixels P1 and P2. It is preferred to multiply $\Delta y_{i,j}$ by a predetermined coefficient (for example, k=0.5).

In each of the first and second images I1 and I2, the brightness information of the image in the y direction is missing at every other pixel. The brightness information of the missing pixel can be generated by an interpolation using pieces of brightness information of adjacent pixels in the y direction. For example, when the brightness information of coordinates (i, j+1) is missing in an image, the brightness information of the coordinates (i, j+1) can be interpolated by averaging pieces of brightness information of coordinates (i, j) and coordinates (i, j+2). When obtaining the sharpness E of the coordinates (i, j+1) by using (Equation 2), it suffices to set k=1, and then $\Delta y_{i,j}$ becomes a difference between the brightness value of the pixel at the coordinates (i, j) in the image block of the predetermined size and the brightness value of the pixel at the coordinates (i, j+1) (value interpolated by using the brightness information of the coordinates (i, j+2)). From a calculation of (Equation 2), a larger sharpness can be obtained as the difference of the brightness value in the image block of the predetermined size increases.

A method of obtaining the sharpness E in the block having the predetermined size based on the frequency spectra obtained by the Fourier transform is described below. The image is a two-dimensional object, and hence a method of obtaining the sharpness by using a two-dimensional Fourier transform is described. A case of obtaining the sharpness of a predetermined block size by using the two-dimensional Fourier transform is described.

Figure 9:
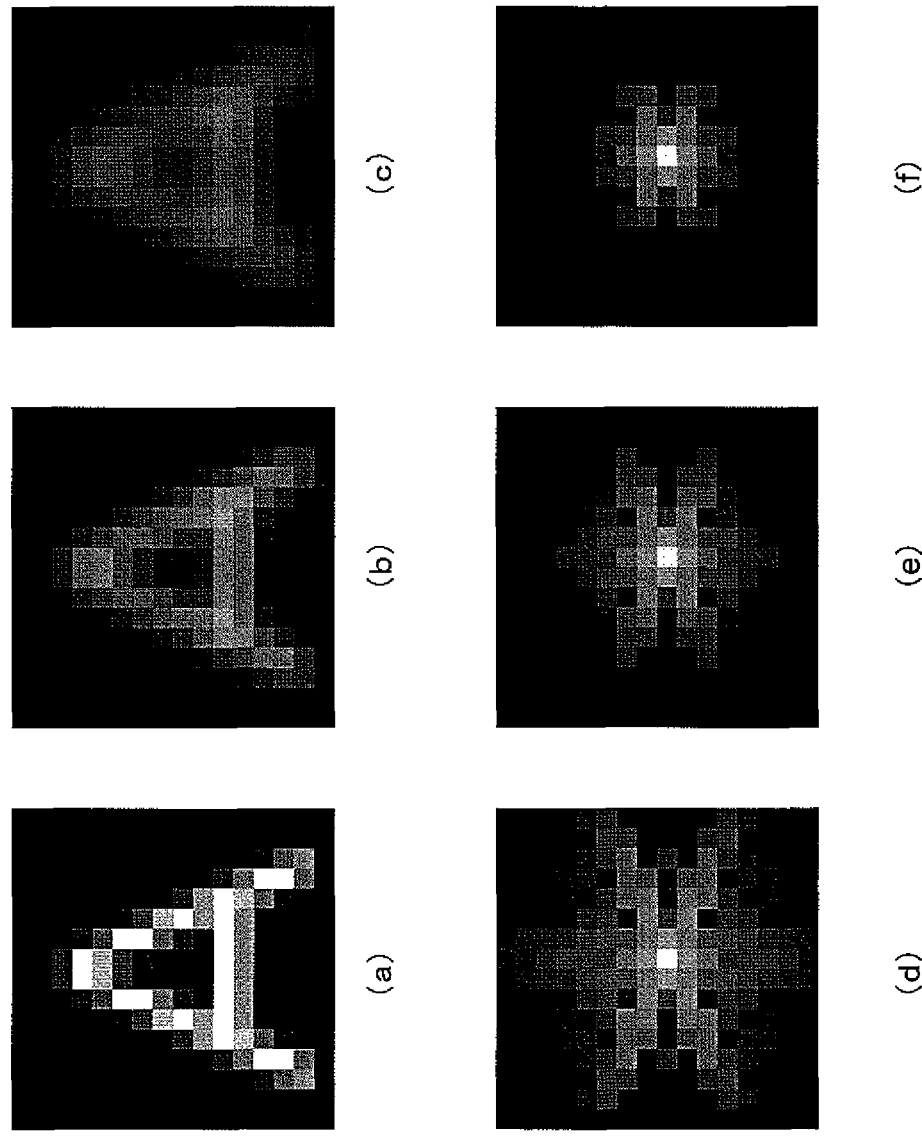
FIGS. 9(a) to 9(c) illustrate brightness profiles of an image block of 16×16 size.
FIGS. 9(d) to 9(f) illustrate frequency spectra obtained by performing a two-dimensional Fourier transform on the image blocks illustrated in FIGS. 9(a) to 9(c), respectively.

FIGS. 9(a) to 9(c) illustrate brightness profiles of an image block of 16×16 size. The sharpness is decreased in the order of FIGS. 9(a), 9(b), and 9(c). FIGS. 9(d) to 9(f) illustrate the frequency spectra obtained by performing the two-dimensional Fourier transform on the image blocks illustrated in FIGS. 9(a) to 9(c), respectively. In FIGS. 9(d) to 9(f), for a better understanding, the intensity of each frequency spectrum is displayed in a logarithmic conversion, where the image is brighter as the frequency spectrum is stronger. A portion having the highest brightness at the center in each frequency spectrum is a direct-current component, and the frequency is increased toward a peripheral portion.

In FIGS. 9(d) to 9(f), it is found that the high frequency spectrum is missing as the sharpness of the image is decreased. Therefore, in order to obtain the sharpness from these frequency spectra, for example, the whole or a part of the frequency spectra needs to be extracted.

A range Z in FIG. 8(a) indicates an area where G1 is changed but G2 is not substantially changed. In the range Z, the subject distance can be obtained by using this relationship. For example, in the range Z, there is a correlation between the subject distance and a ratio of the sharpnesses G1 and G2, and therefore, the correlation between the subject distance and the ratio of the sharpnesses G1 and G2 are stored in the memory unit Me in advance.

When using the imaging device, among pieces of data obtained from a result of a single imaging operation, the ratio of the sharpnesses of the first image I1 generated only by the pixels P1 and the second image I2 generated only by the pixels P2 is obtained for each operation block. The subject distance can be obtained then by using the correlation stored in the memory unit Me. Specifically, for each operation block, the ratio of the sharpnesses in the correlation and a value of the ratio of the sharpnesses of the first image I1 and the second image I2 are compared with each other. A subject distance corresponding to a value at which the ratios match each other is then taken as a distance to the subject at the time of imaging.

In order to obtain the subject distance in a unique manner from the ratio of the sharpness of the first image I1 generated only by the pixels P1 and the sharpness of the second image I2 generated only by the pixels P2, all the ratios of the sharpnesses need to differ from each other in a predetermined subject distance range.

In FIG. 8(a), all the ratios of the sharpnesses differ from each other in the range Z, and hence the subject distance can be obtained in a unique manner. In addition, the ratio can hardly be obtained if the value of the sharpness is too small, and hence it is preferred that the value of the sharpness be equal to or larger than a predetermined value.

The relationship between the subject distance and the sharpness is determined by the curvature radiuses, the aspheric coefficients, and the refractive indexes of the optical plane areas D1 and D2. That is, the optical plane areas D1 and D2 need to have optical properties in which all the ratios of the sharpness of the first image I1 and the sharpness of the second image I2 differ from each other in a predetermined distance range.

In this embodiment, so long as it is a value (brightness information) calculated by using the brightness, any value other than the sharpness, for example, a contrast can be used to obtain the subject distance. The contrast can be obtained, for example, from a ratio of the maximum brightness value and the minimum brightness value in a predetermined operation block. While the sharpness is a difference of the brightness, the contrast is a ratio of the brightness values. The contrast can be obtained from a ratio of a point of the maximum brightness value and a point of the minimum brightness value or, for example, from a ratio of an average value of several upper points of the brightness value and an average value of several lower points of the brightness value. In the case of obtaining the subject distance by using the contrast, in the same manner as the case of using the sharpness, a correlation between the subject distance and the ratio of the contrasts is stored in the memory unit Me in advance. By obtaining the ratio of the contrasts of the first image I1 and the second image I2 for each block, the subject distance can be obtained by using the correlation.

FIG. 8(b) is a graph showing the relationship between the subject distance and the sharpness when the optical plane of the optical plane area D2 in FIG. 1 is replaced with a spherical plane having a curvature radius of 400 mm. The range Z indicates an area where both the sharpnesses G1 and G2 are changed. In this case as well, the subject distance can be obtained in the same manner as the case shown in FIG. 8(a).

When the curvature radiuses of the respective areas are set to be different from each other as shown in FIG. 8(b), this embodiment may be configured to generate an image obtained by adding the first image I1 and the second image I2. A distance range in which the sharpness is equal to or higher than a predetermined value for the image generated by adding the first image I1 and the second image I2 is larger than that of the first image I1 or the second image I2. In this case, a ratio of the sharpness of the image generated by the addition and the sharpness of any one of the first image I1 and the second image I2 has a correlation with the subject distance. By storing this correlation in advance, the subject distance can be obtained for each predetermined area of the image.

In this embodiment, any one of the method obtaining the sharpness from the difference of the brightness value between the adjacent pixels and the method of obtaining the sharpness by the Fourier transform can be employed. However, the brightness value is a relative value, and hence the brightness value obtained in the former method is different from the brightness value obtained in the latter method. Therefore, the method of obtaining the sharpness for obtaining the correlation (correlation between the subject distance and the ration of the sharpnesses to be stored in advance) and the method of obtaining the sharpness at the time of imaging need to be matched.

The optical system of the imaging device shown in Table 1 and Table 2 is set as an image-side telecentric optical system. Therefore, even when the angle of view is changed, the incident angle of the main light beam on the array-shaped optical element K is close to zero so that a crosstalk between the light beam arriving at the pixel P1 and the light beam arriving at the pixel P2 can be reduced in the whole area of the imaging.

In this embodiment, an image-side non-telecentric optical system can be used as the lens optical system L. In this case, the curvature radiuses of the two areas on the optical element L1 differ from each other, and hence magnifications of the images obtained from the areas (first image I1 and second image I2) differ from each other. When the above-mentioned ratio of the sharpness is calculated for each area of the image, a predetermined area to be referred is deviated outside the optical axis, and it becomes hard to obtain the ratio of the sharpness in a correct manner. In this case, the ratio of the sharpness can be obtained in a correct manner by obtaining the ratio of the sharpness in the predetermined area by correcting the magnifications of the first image I1 and the second image I2 to be substantially equal to each other.

Further, in the first embodiment, dimensions of the optical plane area D1 and the optical plane area D2 are configured to be equal to each other. With this configuration, exposing amounts of the pixel P1 and the Pixel P2 can be set equal to each other. When the dimensions of the optical plane area D1 and the optical plane area D2 are different from each other, it is preferred to set exposing times differently for the pixel P1 and the pixel P2. For example, when the dimension of the optical plane area D1 is larger than the dimension of the optical plane area D2, it is preferred to set the exposing time of the pixel P1 shorter than the exposing time of the pixel P2.

As described above, according to this embodiment, the correlation between the ratio of the sharpnesses (or contrasts) of the images obtained from the two optical plane areas D1 and D2 of the optical element L1 and the subject distance is stored in advance, and the distance to the subject is obtained based on the ratio of the sharpnesses (or contrasts) of the obtained first and second images I1 and I2 and the stored correlation. In this embodiment, the distance to the subject can be obtained through a single imaging operation by using a single imaging system, and hence unlike an imaging device employing a plurality of imaging optical systems, it is not required to match the properties and the positions between the plurality of imaging optical systems. Further, when a moving image is recorded by using the imaging device according to this embodiment, even if the position of the subject is changed with time, the distance to the subject can be measured in an accurate manner.

(Second Embodiment)

The second embodiment is different from the first embodiment in that the optical element L1 is divided into four areas and a microlens is used as the array-shaped optical element instead of the lenticular lens. In this embodiment, as for the contents similar to those of the first embodiment, the detailed descriptions thereof are omitted herein.

Figure 10:
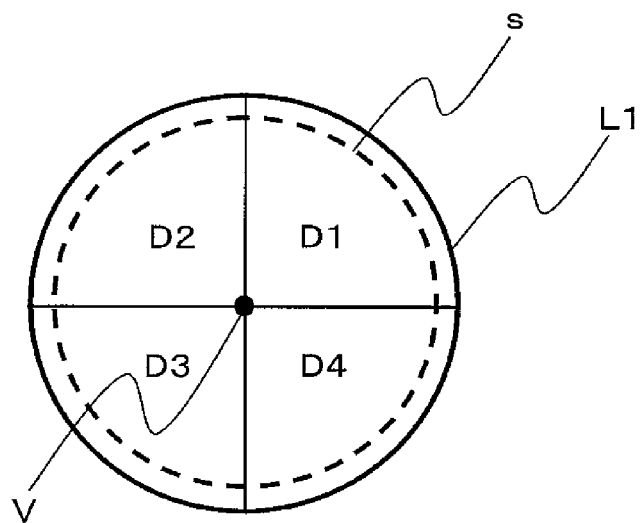
FIG. 10 is a front view of an optical element L1 according to a second embodiment of the present invention viewed from a subject side.

FIG. 10 is a front view of the optical element L1 viewed from the subject side. Optical plane areas D1, D2, D3, and D4 are divided as four up, down, left, and right areas on a plane perpendicular to the optical axis V with the optical axis V as a boundary center. The optical plane area D1 is a planar surface, the optical plane area D2 is a spherical lens having a curvature radius of 300 mm, the optical plane area D3 is a spherical lens having a curvature radius of 200 mm, and the optical plane area D4 is a spherical lens having a curvature radius of 120 mm, and the optical axis of the spherical lens of each area is the above-mentioned optical axis V. The dashed line s indicates a position of the stop S.

Figure 11:
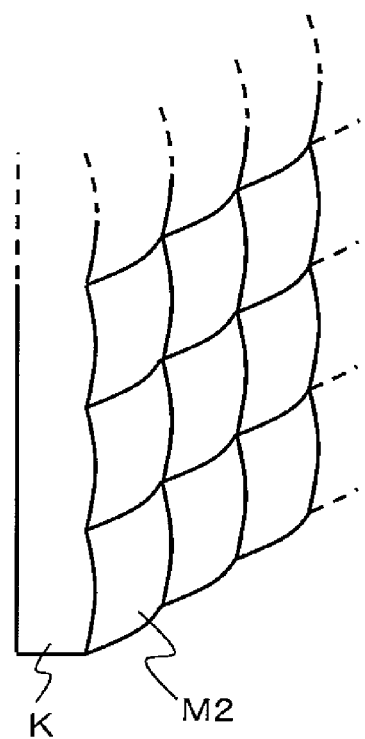
FIG. 11 is a perspective view of an array-shaped optical element K according to the second embodiment of the present invention.

FIG. 11 is a perspective view of the array-shaped optical element K. On a surface of the array-shaped optical element K on the imaging element N side, optical elements M2 are arranged in a lattice shape. A cross section of each of the optical elements M2 (each of cross sections in the longitudinal direction and the lateral direction) has an arc shape, and each of the optical elements M2 are protruding toward the imaging element N side. In this manner, the optical element M2 is a microlens and the array-shaped optical element K has a configuration of a lenticular lens array.

FIG. 12(a) is an enlarged diagram of the array-shaped optical element K and the imaging element N, and FIG. 12(b) is a diagram illustrating a positional relationship between the array-shaped optical element K and pixels on the imaging element N. In the same manner as the first embodiment, the array-shaped optical element K is arranged near the focal point of the lens optical system L at a position apart from the imaging plane Ni by a predetermined distance. On the imaging plane Ni, the microlens Ms is provided to cover surfaces of pixels P1, P2, P3, and P4.

Further, the array-shaped optical element K is arranged so that the surface on which the optical elements M2 are formed faces the imaging plane Ni side. The array-shaped optical element K is arranged so that one of the optical elements M2 corresponds to the four pixels P1 to P4 of two rows and two columns on the imaging plane Ni.

With this configuration, a majority of the light beams that have passed through the optical plane areas D1, D2, D3, and D4 on the optical element L1 illustrated in FIG. 10 arrives at the pixel P1, the pixel P2, the pixel P3, and the pixel P4 on the imaging plane Ni.

In the same manner as the first embodiment, by the first signal processing unit C1, the first image I1, the second image I2, a third image I3, and a fourth image I4 are output from the pixel P1, the pixel P2, the pixel P3, and the pixel P4, respectively.

The curvature radiuses of the optical plane areas D1, D2, D3, and D4 of the optical element L1 are configured to differ from one another, and hence the imaging device A can acquire four images that are obtained with four focusing properties in a simultaneous manner.

Figure 13:
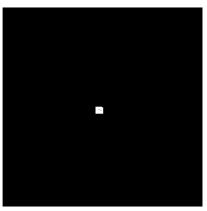
FIG. 13 is a diagram illustrating a point-image intensity profile for each subject distance according to the second embodiment of the present invention.

FIG. 13 is a diagram illustrating the point-image intensity profile for each subject distance. The point-image intensity profile illustrated in FIG. 13 is obtained by a simulation with a pixel pitch on the imaging element illustrated in FIG. 12 set to 6 μm and a pitch of the optical elements M2 of the array-shaped optical element K set to 12 μm. The left column of FIG. 13 is the point-image intensity profile of the whole pixels. The second column from the left is the point-image intensity profile obtained by extracting only the point-image intensity profile of the pixel P1 and masking the point-image intensity profiles of the other pixels 4 at zero level. That is, the second column from the left is the point-image intensity profile formed by the light beam that has passed through the optical plane area D1. In the same manner, the third column, the fourth column, and the fifth column from the left are the point-image intensity profiles formed by the light that have beams passed through the optical plane area D2, D3, and D4, respectively. It is found that sizes of the point images of the point-image intensity profiles formed by the pixels P1, P2, P3, and P4 are minimized at subject distances of 4,000 mm, 590 mm, 390 mm, and 230 mm, respectively.

Figure 14:
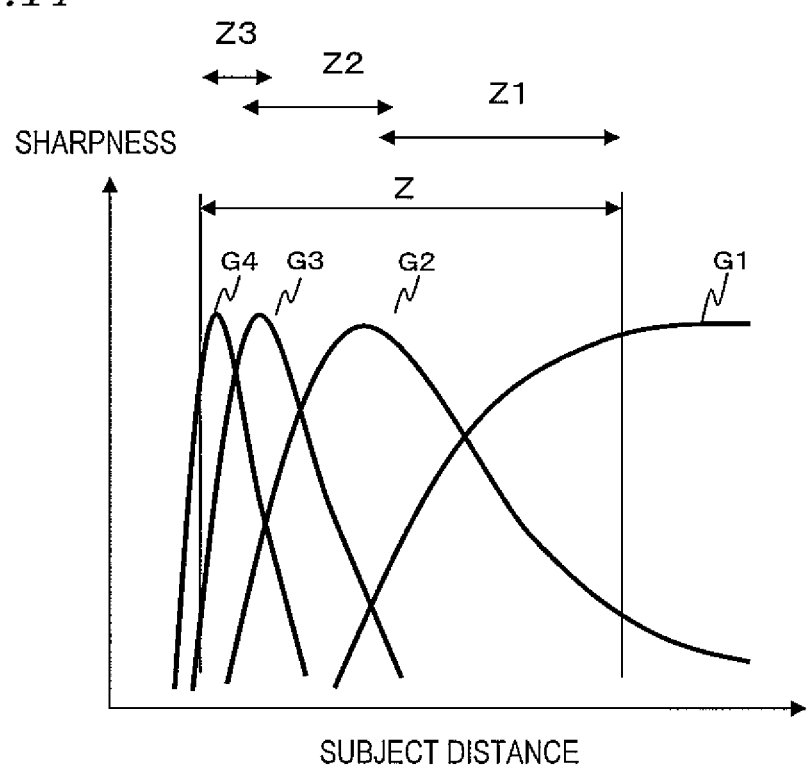
FIG. 14 is a graph showing a relationship between a subject distance and a sharpness according to the second embodiment of the present invention.

In the same manner as the first embodiment, a graph of a relationship between the subject distance and the sharpness provides a relationship shown in FIG. 14. In the graph of FIG. 14, G1, G2, G3, and G4 indicate sharpnesses of predetermined areas of the image generated only by the pixels P1, P2, P3, and P4, respectively.

Further, a range Z indicates an area where any one of the sharpnesses G1, G2, G3, and G4 is changed. In the range Z, it is possible to obtain the subject distance by using this relationship. For example, there is a correlation in the ratio of the sharpnesses G1 and G2 in a range Z1, in the ratio of the sharpnesses G2 and G3 in a range Z2, and in the ratio of the sharpnesses G3 and G4 in a range Z3. The correlation between the ratio of the sharpness and the subject distance is stored in the memory unit Me in advance. In an actual imaging, the ratio of the sharpness of the first and second images I1 and I2, the ratio of the sharpness of the second and third images I2 and I3, and the ratio of the sharpness of the third and fourth images I3 and I4 are calculated by the second signal processing unit C2. The ratios of the sharpness are then compared with the ratio of the sharpness in the correlation stored in the memory unit in advance for each operation block. A subject distance corresponding to a value at which the ratios match each other is then taken as a distance to the subject at the time of imaging.

Figure 8:
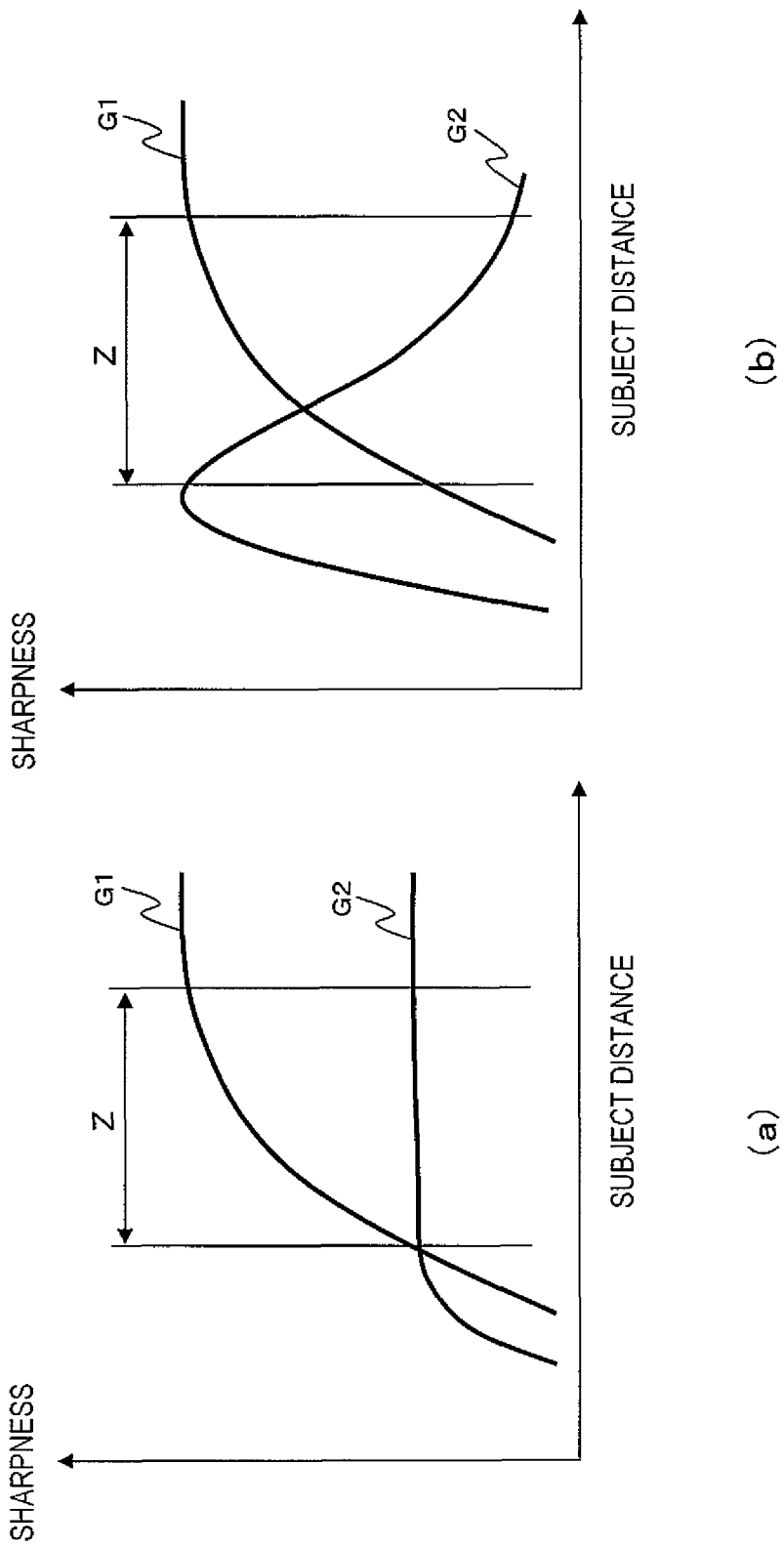
FIGS. 8(a) and 8(b) are graphs showing a relationship between a subject distance and a sharpness (sharpness of an image) according to the first embodiment of the present invention.

In this embodiment, by dividing the optical element L1 into four areas having optical properties that cause the focusing properties to differ from one another, it is possible to broaden a subject distance range that can be measured compared to the embodiment in which the optical element L1 is divided into two areas as in the first embodiment. This point is described in detail. When the optical element L1 is divided into two areas, as shown in FIG. 8, the subject distance can be obtained in the range Z. On the other hand, when the optical element L1 is divided into four areas, the subject distance can be obtained in the range Z1 shown in FIG. 14, and at the same time, there are more subject distance ranges that can be measured other than the range Z1. That is, even in a subject distance with which a value of the sharpness G1 is too small to obtain the ratio of the sharpnesses G1 and G2, the ratio of the sharpnesses G2 and G3 can be obtained in the range Z2 and the ratio of the sharpnesses G3 and G4 can be obtained in the range Z3. With this configuration, it is possible to broaden the subject distance range that can be measured compared to the embodiment in which the optical element L1 is divided into two areas as shown in FIG. 8.

The second embodiment can be configured to generate an image obtained by adding the first image I1, the second image I2, the third image I3, and the fourth image I4. A distance range in which the sharpness is equal to or higher than a predetermined value for the image generated by adding the first to fourth images I1 to I4 is larger than that of each of the first to fourth images I1 to I4. In this case, ratio of the sharpness of the image generated by adding the first to fourth images I1 to I4 and any one of the sharpnesses G1 to G4 of the first to fourth images I1 to I4 has a correlation with the subject distance. By storing the correlations in advance, the subject distance can be obtained for each predetermined area of the image.

Although the image-side telecentric optical system is used in this embodiment, an image-side non-telecentric optical system can be used as the lens optical system L. In this case, the curvature radiuses of the four areas of the optical element L1 differ from one another, and hence magnifications of the images obtained from the areas (first image I1, second image I2, third image I3, and fourth image I4) differ from one another. When the above-mentioned ratio of the sharpness is calculated for each area of the image, a predetermined area to be referred is deviated outside the optical axis, and it becomes hard to obtain the ratio of the sharpness in a correct manner.

Therefore, by obtaining the ratio of the sharpness in the predetermined area by correcting the magnifications of the first image I1, the second image I2, the third image I3, and the fourth image I4 to be substantially equal to one another, the ratio of the sharpness can be obtained in a correct manner.

Further, in the second embodiment, dimensions of the optical plane areas D1 to D4 are configured to be equal to one another. With this configuration, exposing amounts of the pixels P1 to P4 can be set equal to one another. When the dimensions of the optical plane areas D1 to D4 are different from one another, it is preferred to set exposing times differently for the pixels P1 to P4. In this case, it is preferred to set a longer exposing time for a pixel having a smaller dimension.

(Third Embodiment)

The third embodiment is different from the second embodiment in that the area of the optical element L1 is divided into concentric circles and nine pixels correspond to one microlens of the microlens array that is the array-shaped optical element. In this embodiment, as for the contents similar to those of the first embodiment, the detailed descriptions thereof are omitted herein.

Figure 15:
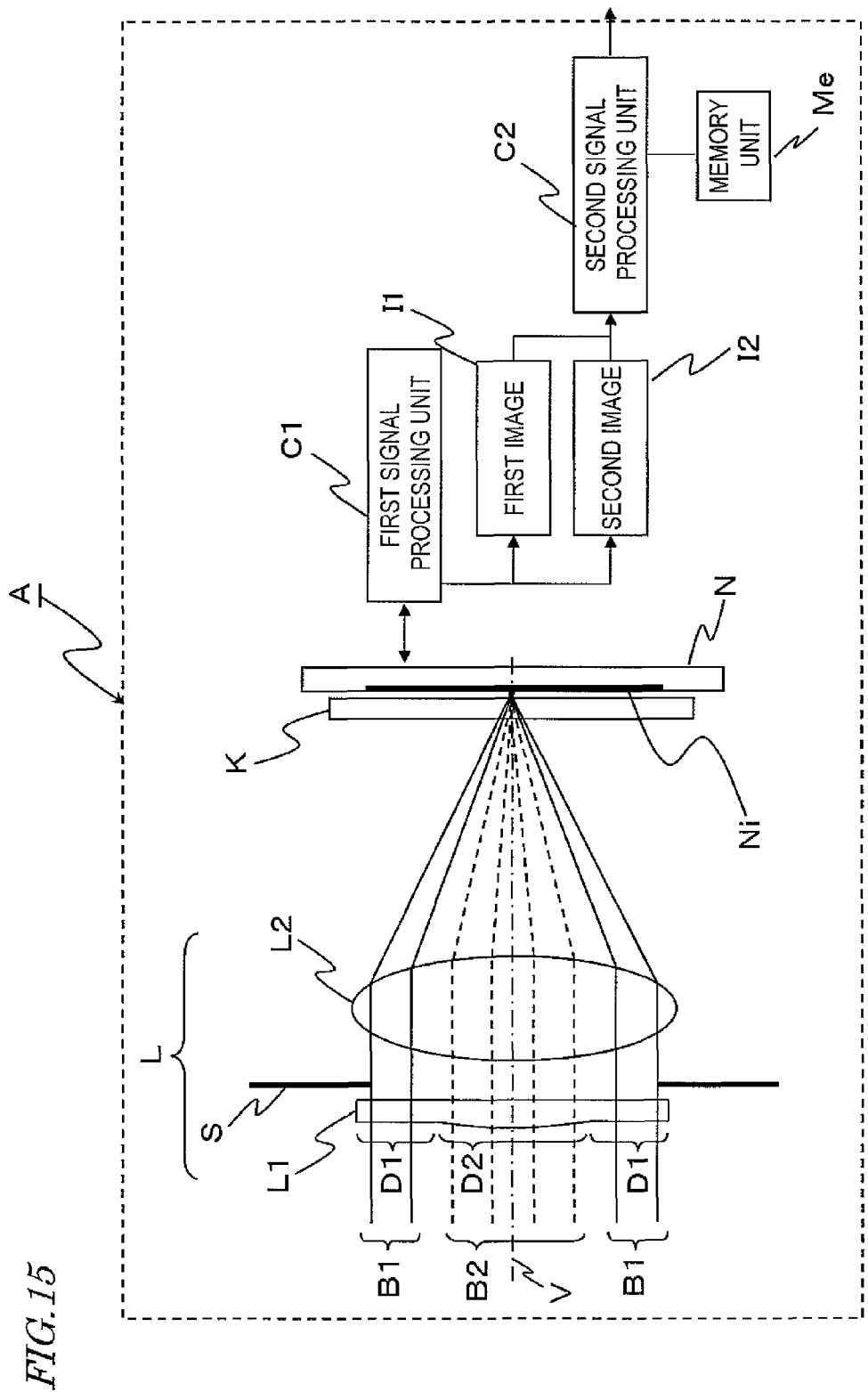
FIG. 15 is a schematic diagram illustrating an imaging device A according to a third embodiment of the present invention.

FIG. 15 is a schematic diagram illustrating an imaging device A according to the third embodiment of the present invention. In FIG. 15, the same components as those of the first embodiment are assigned with the same reference symbols.

Figure 16:
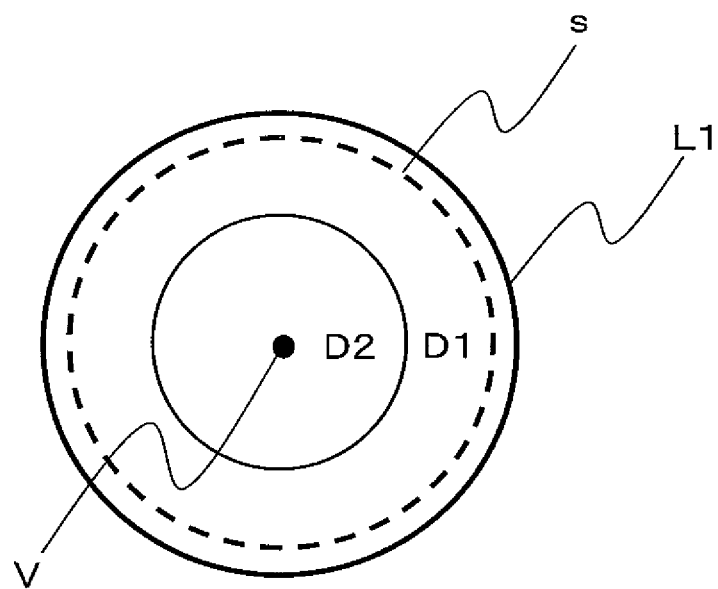
FIG. 16 is a front view of an optical element L1 according to the third embodiment of the present invention viewed from a subject side.

FIG. 16 is a front view of the optical element L1 viewed from a subject side, which is divided into two optical plane areas D1 and D2 that are concentric circles about the optical axis V. The optical plane area D1 is a planar surface, and the optical plane area D2 is an optical plane that generates a substantially constant point-image intensity profile in a predetermined range near the focal point of the lens optical system L. The dashed line s indicates a position of the stop S.

In this embodiment, the configuration of the array-shaped optical element K is the same as that of the second embodiment, and a perspective view of the array-shaped optical element K according to this embodiment is the same as that illustrated in FIG. 11.

Figure 17:
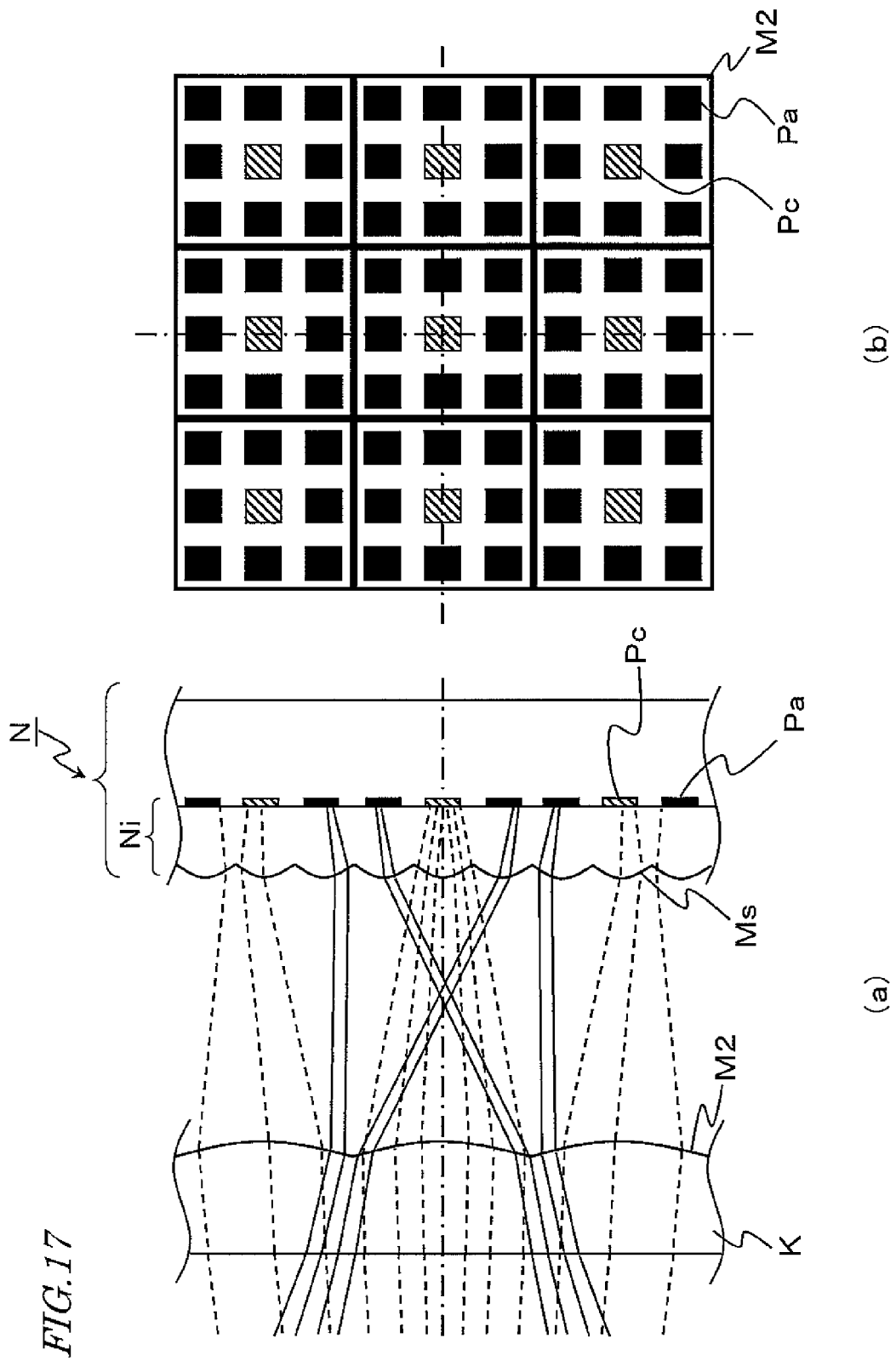
FIG. 17(a) is an enlarged diagram of an array-shaped optical element K and an imaging element N illustrated in FIG. 15.
FIG. 17(b) is a diagram illustrating a positional relationship between the array-shaped optical element K and pixels on the imaging element N.

FIG. 17($a$) is an enlarged diagram of the array-shaped optical element K and the imaging element N illustrated in FIG. 15, and FIG. 17($b$) is a diagram illustrating a positional relationship between the array-shaped optical element K and pixels on the imaging element N. The array-shaped optical element K is arranged near the focal point of the lens optical system L at a position apart from the imaging plane Ni by a predetermined distance. On the imaging plane Ni, the microlens Ms is provided to cover surfaces of pixels Pc, and Pa.

Further, the array-shaped optical element K is arranged so that the surface on which the optical elements M2 are formed faces the imaging plane Ni side. The array-shaped optical element K is arranged so that one of the optical elements M2 corresponds to a total of nine pixels including one pixel Pc and eight pixels Pa on the imaging plane Ni.

With this configuration, a majority of the light beam (light beam B1 indicated by a solid line in FIG. 15) that has passed through the optical plane area D1 on the optical element L1 illustrated in FIG. 16 arrives at the pixel Pa on the imaging plane Ni, and a majority of the light beam (light beam B2 indicated by a dashed line in FIG. 15) that has passed through the optical plane area D2 arrives at the pixel Pc on the imaging plane Ni.

The diameter of the optical plane area D2 of the optical element L1 is set so that the F value of the lens is 4, and the diameter of the optical plane area D1 of the optical element L1 is set so that the F value of the lens is 2.8. On the other hand, the focal length of the optical element L1 is 10 mm.

Inputting the F value and the focal length of the optical plane areas D1 and D2 in the following (Equation 3) gives the lens effective diameter of the optical plane area D2 and the lens effective diameter of the optical plane area D1 of 2.5 mm and 3.54 mm, respectively.

$$F=f/D \text{ (}f\text{: focal length, }D\text{: lens effective diameter)} \quad \text{[Equation 3]}$$

The radius of the lens of the optical plane area D2 is 1.25 mm and the radius of the lens of the optical plane area D1 is 1.77 mm, and hence it is required that the dimension of the lens of the optical plane area D2 be $(1.25)^2\pi \approx 1.56\pi$ mm$^2$ and the dimension of the lens of the optical plane area D1 be $3.13\pi$ mm$^2$. From this result, the dimension of the optical plane area D2 on the optical element L1 is $1.56\pi$ mm$^2$, the dimension of the optical plane area D1 on the optical element L1 is 1.57 mm$^2$ that is a value obtained by subtracting $1.56\pi$ mm$^2$ from $3.13\pi$ mm$^2$. In this manner, the dimensions of the optical plane areas D1 and D2 on the optical element L1 are substantially equal to each other. When the dimensions of the optical plane areas D1 and D2 are substantially equal to each other, a total of the light amounts that enter the eight pixels Pa and the light amount that enters the pixel Pc in a certain time can be substantially equal to each other. Therefore, the exposing times on the optical plane areas D1 and D2 can be controlled to be equal to each other.

By the first signal processing unit C1 illustrated in FIG. 15, the first image I1 formed only by the pixel Pa and the second image I2 formed only by the pixel Pc are output.

In the same manner as the first embodiment, the first image I1 and the second image I2 are images obtained by causing the optical properties of the optical plane area D1 and the optical plane area D2 of the optical element L1 to differ from each other, and hence the imaging device A can acquire images having different distance ranges with which the sharpness is equal to or higher than a predetermined value and different distances to a focusing subject in a simultaneous manner.

A method of obtaining the subject distance is described in detail below.

Figure 18:
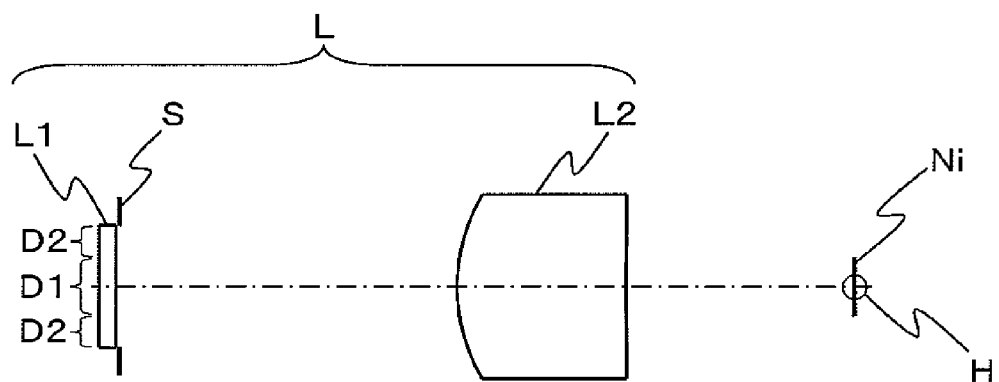
FIG. 18 is a cross-sectional view of the imaging device A according to the third embodiment of the present invention.

FIG. 18 is a cross-sectional view of the imaging device A according to the third embodiment of the present invention. In FIG. 18, the same components as those illustrated in FIG. 15 are assigned with the same reference symbols. Although the array-shaped optical element K (illustrated in, for example, FIG. 15) is omitted from drawing in FIG. 18, the array-shaped optical element K and the imaging plane Ni are included in the area H in FIG. 18. The area H has the configuration illustrated in FIG. 17($a$).

Table 3 and Table 4 show design data of the optical system of the imaging device A illustrated in FIG. 18. The symbols in Table 3 and Table 4 are the same as those in Table 1 and Table 2.

TABLE 3

Lens data
Focal length = 10 mm, F value = 2.8, Wavelength 550 nm
Angle of view 2ω = 10°, Effective imaging circle
diameter = φ 1.75 mm

| Plane number | Ri | di | nd | vd |
|---|---|---|---|---|
| Object | ∞ | 4,000 | — | — |
| R1 plane | ∞ | 0.5 | 1.5253 | 56.0 |
| R2 plane | ∞ | 0.1 | — | — |
| Stop | ∞ | 10 | — | — |
| R3 plane | 5.332237 | 5 | 1.5253 | 56.0 |
| R4 plane | −319.8501 | 6.75 | — | — |
| Image plane | ∞ | — | — | — |

TABLE 4

| | | Aspheric coefficient | | | | |
|---|---|---|---|---|---|---|
| | | k | A4 | A6 | A8 | A10 |
| R1 plane | Area D1 | 0 | 0 | 0 | 0 | 0 |
| | Area D2 | 0 | 0.00058968 | 0.00026241 | 0 | 0 |
| R3 plane | | −0.2969869 | 0.000421138 | −0.000059237 | 0.000016321 | −0.000001294 |
| R4 plane | | 0 | 0.00274336 | −0.000566209 | 0.000216386 | −0.000026416 |

Figure 19:
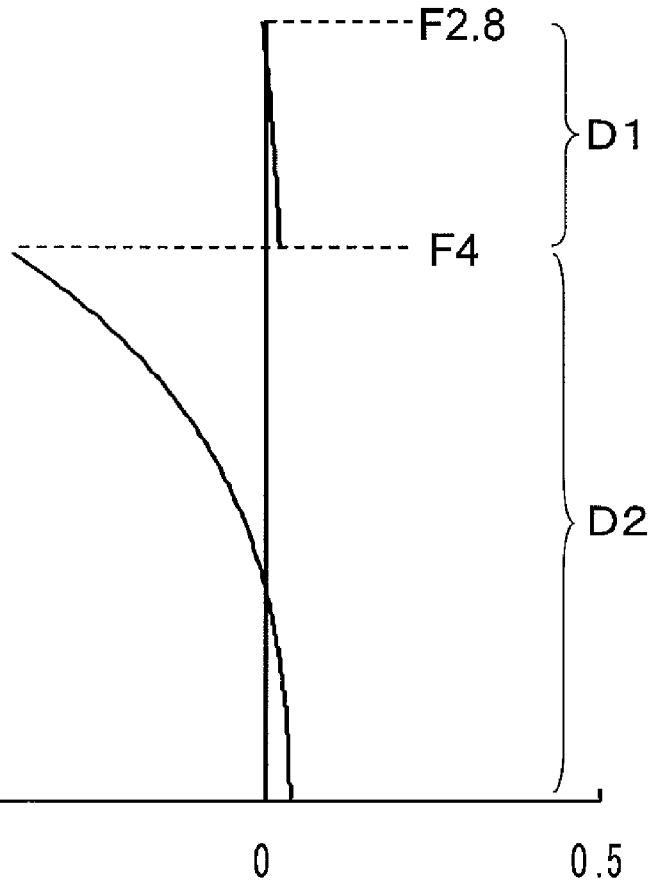
FIG. 19 is a graph showing a spherical aberration caused by light beams that have passed through an optical plane area D1 and an optical plane area D2 according to the third embodiment of the present invention.

FIG. 19 shows a spherical aberration caused by the light beams that have passed through the optical plane area D1 and the optical plane area D2. While the optical plane area D1 is designed so that the spherical aberration caused by the light beam that passes through the optical plane area D1 is decreased, the optical plane area D2 is designed so that the spherical aberration is caused by the light beam that passes through the optical plane area D2. By adjusting the value of the spherical aberration caused by the optical plane area D2, the point-image intensity profile of an image caused by the light that has passed through the optical plane area D2 can be kept substantially constant in the predetermined range near the focal point of the lens optical system L. That is, the point-image intensity profile can be kept substantially constant even when the subject distance is changed.

Figure 20:
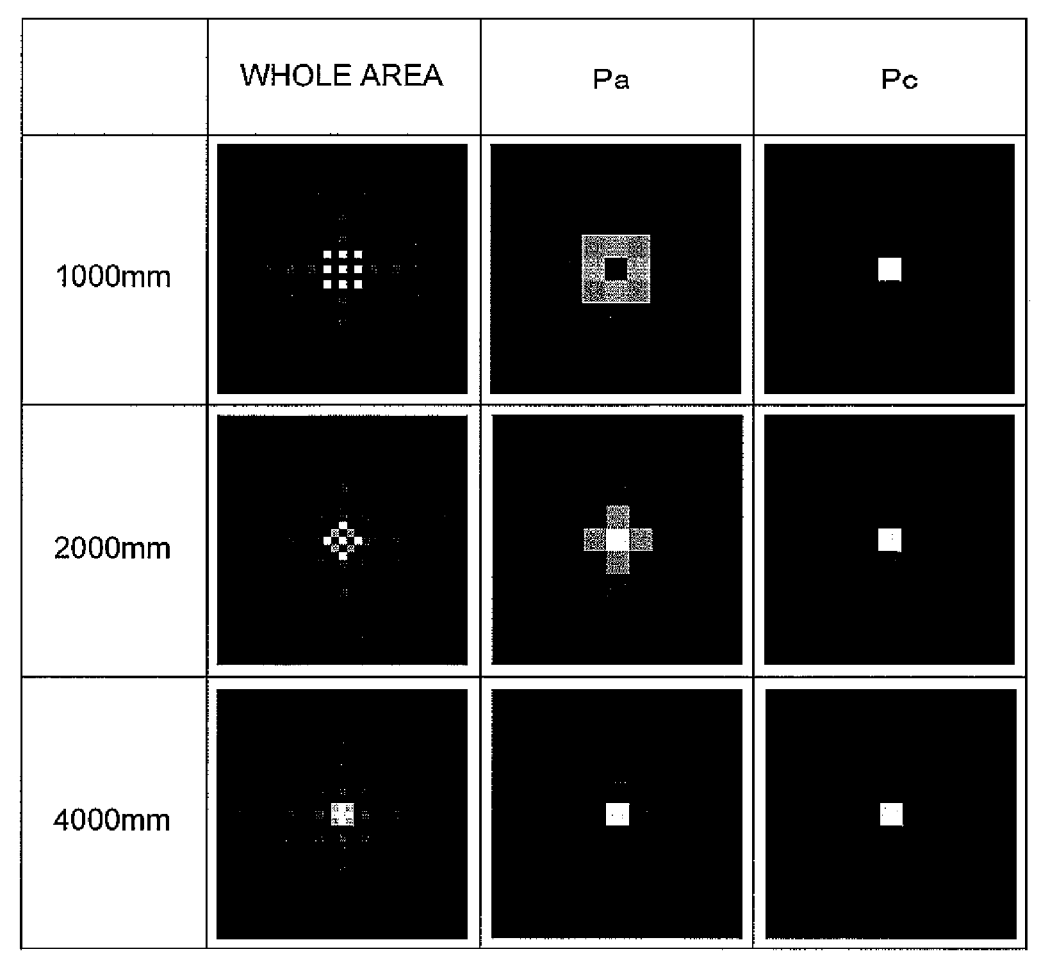

FIG. 20 is a diagram illustrating the point-image intensity profile for each subject distance. The point-image intensity profile illustrated in FIG. 20 is obtained by a simulation with a pixel pitch on the imaging element N illustrated in FIG. 16 set to 4 µm and a pitch of the optical elements M2 of the array-shaped optical element K set to 12 µm. The left column of FIG. 19 is the point-image intensity profile of the whole pixels. The center column is the point-image intensity profile generated by adding the eight pixels Pa to which one of the optical elements M2 of the array-shaped optical element K corresponds, which is the point-image intensity profile formed by the light beam that has passed through the optical plane area D1. The right column is the point-image intensity profile generated by extracting only the point-image intensity profile of the pixel Pc, which is the point-image intensity profile formed by the light beam that has passed through the optical plane area D2. It is found that the point-image intensity profile of the pixel Pc is substantially constant even when the subject distance is changed, and the point-image intensity profile of the pixel Pa is decreased in size of the point image as the subject distance increases.

In the third embodiment as well, the relationship between the subject distance and the sharpness is the same as that of the first embodiment shown in FIG. 8(a), and therefore, the subject distance can be obtained in the range Z.

The third embodiment has a configuration in which the optical element L1 is divided into two concentric circles, and hence there is no parallax between the images obtained from the respective optical plane areas D1 and D2. Therefore, a more accurate distance measurement can be achieved.

The optical plane area D2 can be a spherical lens. With this configuration, the relationship between the subject distance and the sharpness can be the same as that of the first embodiment shown in FIG. 8(b), and the subject distance can be obtained in the range Z.

(Fourth Embodiment)

The fourth embodiment is different from the third embodiment in that the optical element L1 is replaced with a liquid crystal lens that is a varifocal lens. In this embodiment, as for the contents similar to those of the first embodiment, the detailed descriptions thereof are omitted herein.

Figure 21:
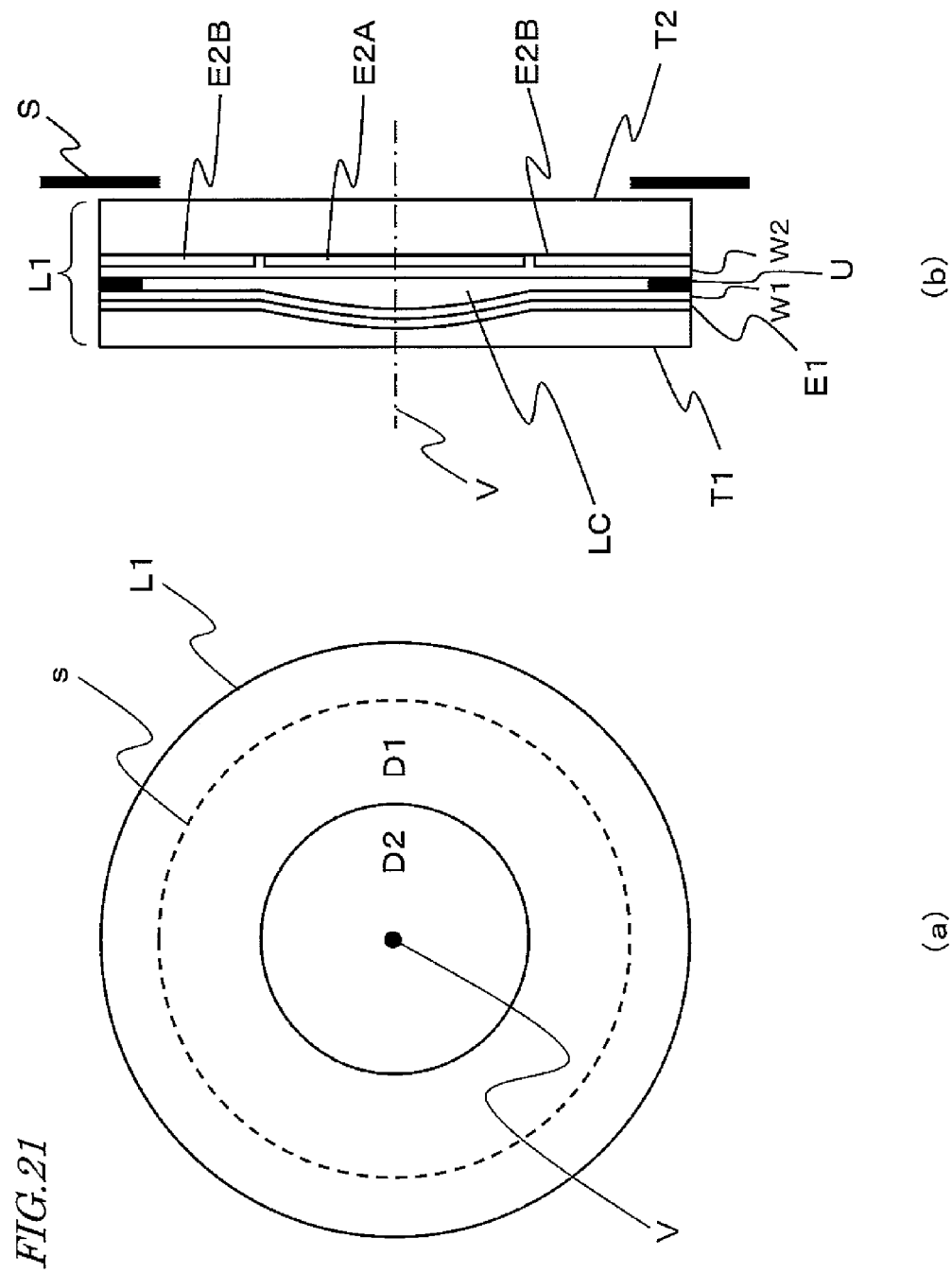
FIG. 21(a) is a front view of an optical element L1 according to a fourth embodiment of the present invention viewed from a subject side.
FIG. 21(b) is a cross-sectional view of the optical element L1 illustrated in FIG. 21(a).

FIG. 21(a) is a front view of the optical element L1 viewed from a subject side. The optical plane areas D1 and D2 in the optical element L1 are divided into two concentric circles about the optical axis V. The dashed line s indicates a position of the stop S.

FIG. 21(b) is a cross-sectional view of the optical element L1 and the stop S. The optical element L1 includes a glass T1 on which a planar concave lens is formed, a transparent electrode E1 formed on the glass T1, an alignment film W1 formed on the transparent electrode E1, a glass T2 having planar surfaces on both sides, transparent electrodes E2A and E2B formed on the glass T2, an alignment film W2 formed on the transparent electrodes E2A and E2B, a seal agent U, and liquid crystal LC. The optical plane area D1 is an area where the transparent electrode E2A is formed, and the optical plane area D2 is an area where the transparent electrode E2B is formed.

The refractive index of the glasses T1 and T2 is N1. The refractive index of the liquid crystal LC is changed between N1 and N2 (N2>N1) by a driving waveform input between the transparent electrode E1 and the transparent electrode E2A. When N2 is larger than N1, the optical plane area D2 of the optical element L1 functions as a convex lens. The refractive index N1 is set so that the light beam that has passed through the optical plane area D2 of the optical element L1 is focused at a focal point relatively far from the optical element L1, and the refractive index N2 is set so that the light that has beam passed through the optical plane area D2 of the optical element L1 is focused at a focal point relatively close to the optical element L1.

An operation of the optical element L1 is described below. Firstly, the driving waveform to be input between the transparent electrode E1 and the transparent electrode E2A is controlled so that the refractive index of the liquid crystal LC becomes N1 right before an exposure. Subsequently, the driving waveform to be input between the transparent electrode E1 and the transparent electrode E2A is controlled after starting the exposure so that the refractive index is gradually increased from N1, and then the driving waveform is controlled so that the refractive index becomes N2 at the time of ending the exposure.

By the above-mentioned control, the image convolved during the exposing time is focused at any point between the relatively far focal point and the relatively close focal point, and hence it is possible to acquire an image having a substantially constant sharpness in a predetermined distance range by the light beam that has passed through the optical plane area D2. On the other hand, the optical plane area D1 has no lens operation during the exposing time. Therefore, the light beam that has passed through the optical plane area D1 is focused only by the lens L2 illustrated in, for example, FIG. 1. As a result, in the image obtained by the light beam that has passed through the optical plane area D1, a size of the point image is decreased as the subject distance increases.

In the fourth embodiment, the sharpness of the image obtained by the light beam that has passed through the optical plane area D2 is substantially constant in a certain subject distance range, and in the image obtained by the light beam that has passed through the optical plane area D1, the sharpness is increased as the subject distance increases. In this manner, in the fourth embodiment as well, the relationship between the subject distance and the sharpness is the same as that of the first embodiment shown in FIG. 8(a), and therefore, the subject distance can be obtained in the range Z.

(Fifth Embodiment)

The fifth embodiment is different from the first to fourth embodiments in that the lenticular lens or the microlens array is formed on an imaging plane. In this embodiment, as for the contents similar to those of the first embodiment, the detailed descriptions thereof are omitted herein.

Figure 22:
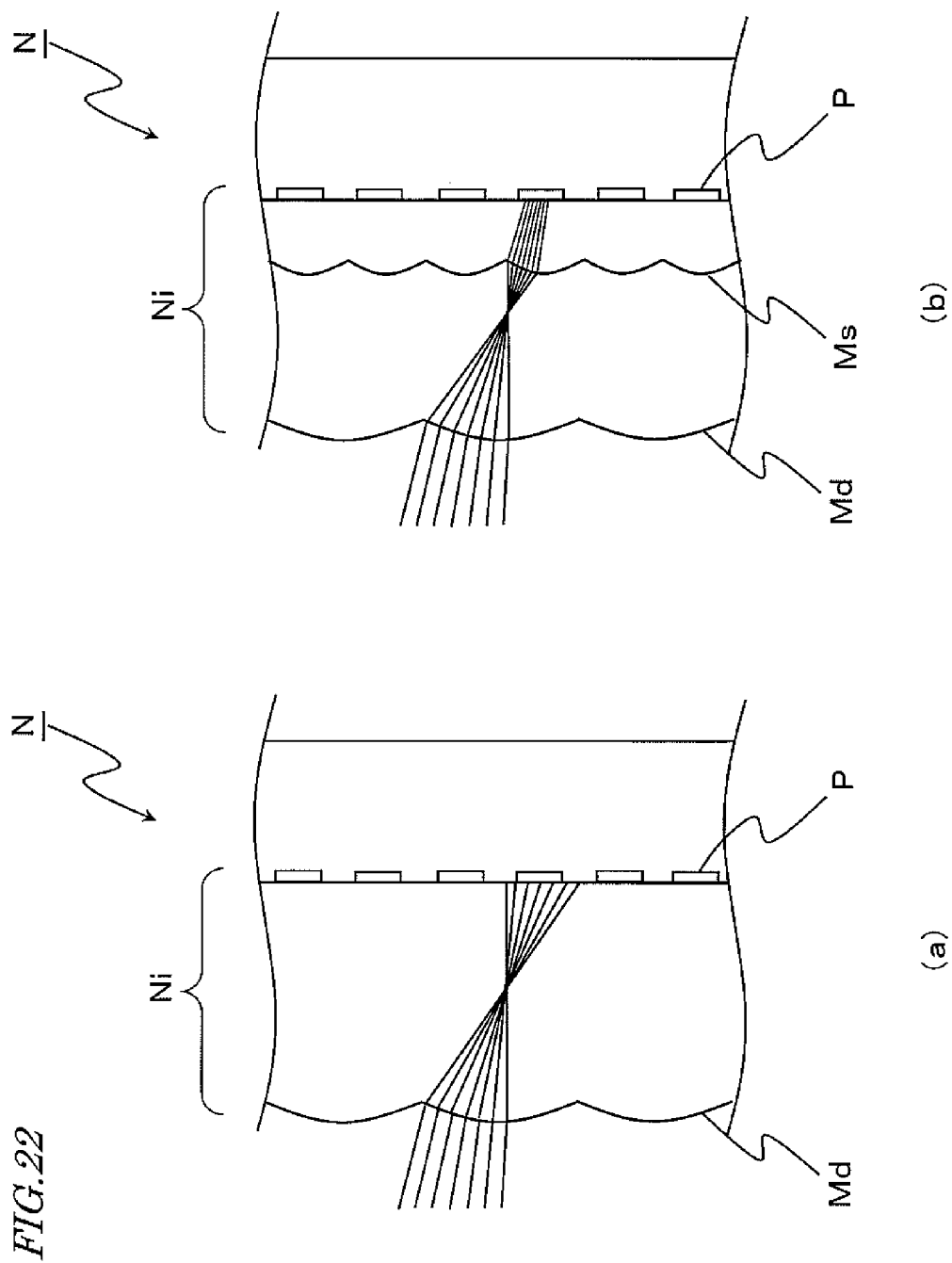
FIGS. 22(a) and 22(b) are enlarged diagrams of an array-shaped optical element K and an imaging element N according to a fifth embodiment of the present invention.

FIGS. 22(a) and 22(b) are enlarged diagrams of the array-shaped optical element K and the imaging element N. In this embodiment, a lenticular lens (or microlens array) Md is formed on the imaging plane Ni of the imaging element N. On the imaging plane Ni, in the same manner as the first embodiment and the like, the pixels P are arranged in a matrix shape. An optical element of one lenticular lens or one microlens corresponds to the plurality of pixels P. In this embodiment as well, in the same manner as the first to fourth embodiments, light beams that have passed through different areas on the optical element L1 can be respectively guided to different pixels. FIG. 22(b) is a diagram illustrating a modification example of this embodiment. In the configuration illustrated in FIG. 22(b), the microlens Ms is formed to cover the pixels P on the imaging plane Ni, and an array-shaped optical element is laminated on a surface of the microlens Ms. The configuration illustrated in FIG. 22(b) can enhance the focusing efficiency compared to the configuration illustrated in FIG. 22(a).

(Sixth Embodiment)

The sixth embodiment is different from the first embodiment in that each pixel corresponding to each optical element of the array-shaped optical element is separated by color. In this embodiment, as for the contents similar to those of the first embodiment, the detailed descriptions thereof are omitted herein.

In this embodiment, as illustrated in FIG. 23(a), pixels of R (red), G (green), and B (blue) are arranged in a repeated manner in one optical element of the array-shaped optical element K. The pixels P of two rows are arranged corresponding to one optical element M1 of the lenticular lens as the array-shaped optical element K. For example, the pixels P1 are arranged on the upper row among the pixels P of two rows and the pixels P2 are arranged on the lower row. Each of the pixels P1 and P2 is separated by color into R (red), G (green), and B (blue). That is, pixels for detecting any one of light beams of R (red), G (green), and B (blue) are provided for each of the pixels P1 and P2. Specifically, on respective surfaces of the pixels P1 and P2, filters for transmitting light beams of different wavelength bands may be provided. With this configuration, each pixel can mainly detect light of any one of colors of R (red), G (green), and B (blue).

FIG. 23(b) is a diagram illustrating a modification example of this embodiment. In the configuration illustrated in FIG. 23(b), the pixels of G (green) and R (red) are arranged in a repeated manner in one optical element M1 of the lenticular lens and the pixels of B (blue) and G (green) are arranged in a repeated manner in another optical element M1 adjacent to this optical element M1.

The configuration according to this embodiment can support a color image.

An image of a single pixel can be generated from information acquired from the six pixels in FIG. 23(a). Further, an image of a single pixel can be generated from information acquired from the two pixels arranged up and down in one optical element M1 illustrated in FIG. 23(a). For example, when an image of a single pixel is generated by using the information acquired from the two pixels of red (R), information of blue (B) and green (G) is interpolated in the image of the single pixel. Information of the pixels arranged around the pixel of red (R) in FIG. 23(a) can be used as the information of blue (B) and green (G).

(Seventh Embodiment)

The seventh embodiment is different from the first embodiment in that each pixel corresponding to each optical element M1 of the array-shaped optical element K is the same color and each pixel is separated by color for each optical element M1. In this embodiment, as for the contents similar to those of the first embodiment, the detailed descriptions thereof are omitted herein.

In this embodiment, as illustrated in FIG. 24(a), the pixels P of two rows are arranged corresponding to one optical element M1 of the lenticular lens as the array-shaped optical element K. For example, the pixels P1 are arranged on the upper row among the pixels P of two rows and the pixels P2 are arranged on the lower row. In this embodiment, all the pixels P1 and P2 corresponding to one optical element M1 of the lenticular lens are the same color. Each of the pixels P1 and P2 is separated by color for each optical element M1, and is arranged in a repeated manner. Each of the pixels P1 and P2 has a filter for transmitting light of a different wavelength, and is capable of mainly detecting light of any one of colors of R (red), G (green), and B (blue).

FIG. 24(b) is a diagram illustrating a modification example of this embodiment. In the configuration illustrated in FIG. 24(b), all the pixels P1, P2, P3, and P4 corresponding to one optical element M2 of the microlens array are the same color. Each of the pixels P1, P2, P3, and P4 is separated by color for each optical element M2, and is arranged in a repeated manner.

With this configuration, it is possible to support a color image in the same manner as the sixth embodiment.

(Eighth Embodiment)

The eighth embodiment has a configuration in which, in the sixth embodiment or the seventh embodiment, the lens optical system has a predetermined on-axis chromatic aberration and a distance to a subject is calculated based on the sharpness (or contrast) of at least two colors.

Figure 25:
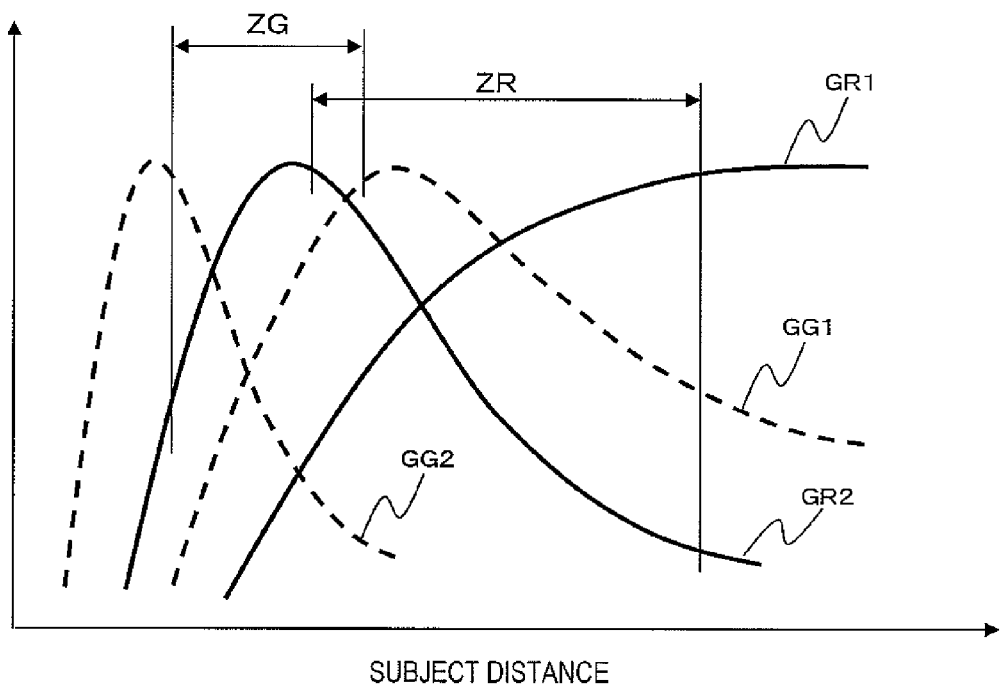
FIG. 25 is a graph showing a relationship between a subject distance and a sharpness according to an eighth embodiment of the present invention.

In this embodiment, a graph of a relationship between the subject distance and the sharpness provides a relationship shown in FIG. 25. In the graph of FIG. 25, a sharpness GR1 indicates a sharpness of a predetermined area of an image generated only by the pixel P1 of a first color, and a sharpness GR2 indicates a sharpness of a predetermined area of an image generated only by the pixel P2 of the first color. Further, a sharpness GG1 indicates a sharpness of a predetermined area of an image generated only by the pixel P1 of a second color, and a sharpness GG2 indicates a sharpness of a predetermined area of an image generated only by the pixel P2 of the second color.

The imaging positions of the first color and the second color are deviated due to the lens optical system having the predetermined on-axis chromatic aberration, and hence profiles of the first color and the second color show shifted properties as shown in FIG. 25. Therefore, the distance to the subject can be obtained by the sharpness of the first color in a relatively far distance range ZR, and the distance to the subject can be obtained by the sharpness of the second color in a relatively close distance range ZG.

With this configuration, it is possible to broaden a range in which the subject distance can be measured compared to a case having no on-axis chromatic aberration.

Although a method of calculating the distance to the subject based on the sharpness (or contrast) of two colors is described in this embodiment, the distance to the subject may be calculated based on the sharpness (or contrast) of three colors or more.

(Ninth Embodiment)

The ninth embodiment is different from the first, second, third, and fourth embodiments in that a light shielding member is arranged on a boundary portion of each optical area of the optical element L1. In this embodiment, as for the contents similar to those of the first embodiment, the detailed descriptions thereof are omitted herein.

Figure 26:
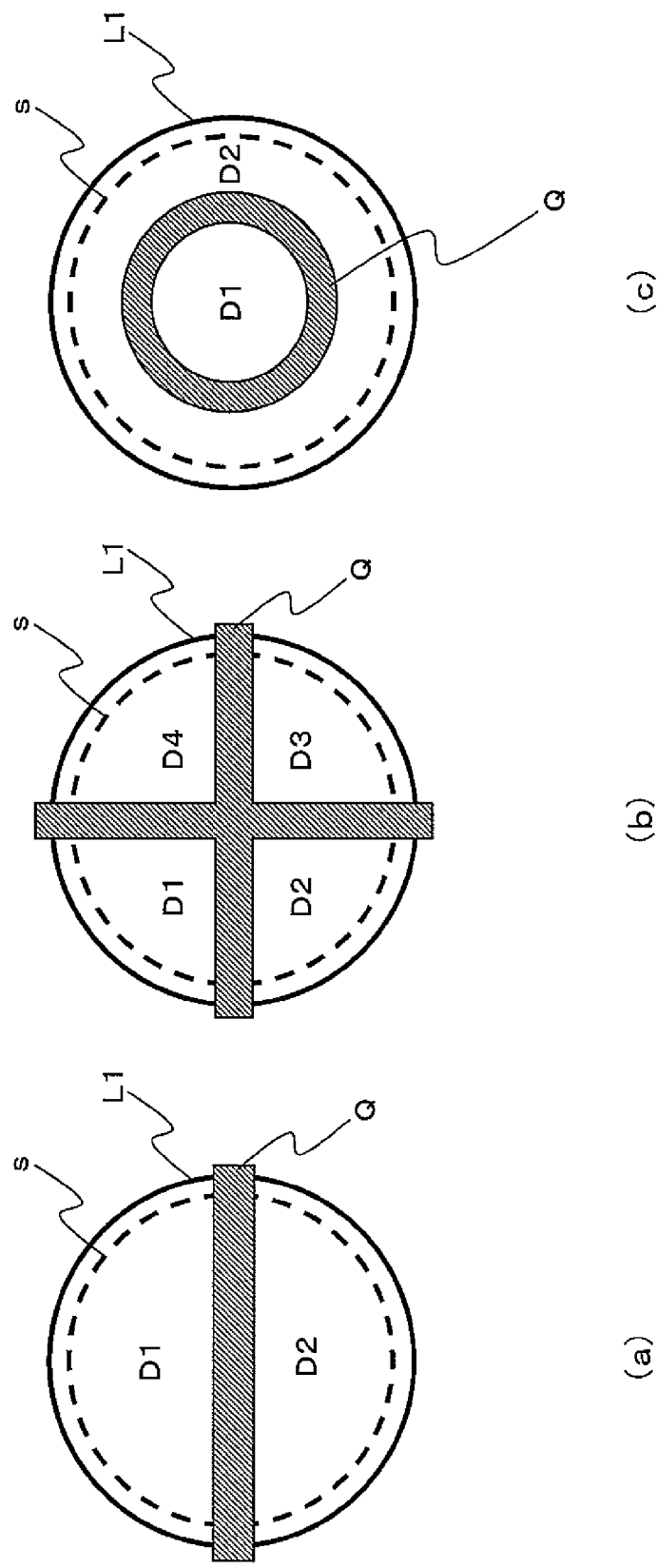
FIGS. 26(a) to 26(c) are front views illustrating a positional relationship between each optical area and a light shielding member according to a ninth embodiment of the present invention.

FIG. 26(a) is a front view illustrating a light shielding member Q arranged on a boundary portion of the optical plane areas D1 and D2 of the first embodiment. FIG. 26(b) is a front view illustrating a light shielding member Q arranged on each boundary portion of the optical plane areas D1, D2, D3, and D4 of the second embodiment. FIG. 26(c) is a front view illustrating a light shielding member Q arranged on a boundary portion of the optical plane areas D1 and D2 of the third and fourth embodiments.

On the boundary portion of each area, the shape of the optical plane is changed in a discontinuous manner, and therefore, a step is generated on the boundary portion, which may generate unnecessary light. Therefore, arranging the light shielding member Q on each boundary portion can suppress the generation of the unnecessary light. As the light shielding member Q, for example, a carbon black-added polyester film or the like can be used. The light shielding member Q can be formed integrally with the stop.

Although the areas divided by the light shielding member Q in FIGS. 26(a) and 26(b) have a line symmetric shape, each of the areas can be a circular, elliptical, or rectangular shape.

(Tenth Embodiment)

The tenth embodiment is different from the first embodiment in that each of the optical plane areas D1 and D2 includes a plurality of areas divided across the optical axis and a microlens is used as the array-shaped optical element K instead of the lenticular lens. In this embodiment, as for the contents similar to those of the first embodiment, the detailed descriptions thereof are omitted herein.

Figure 27:
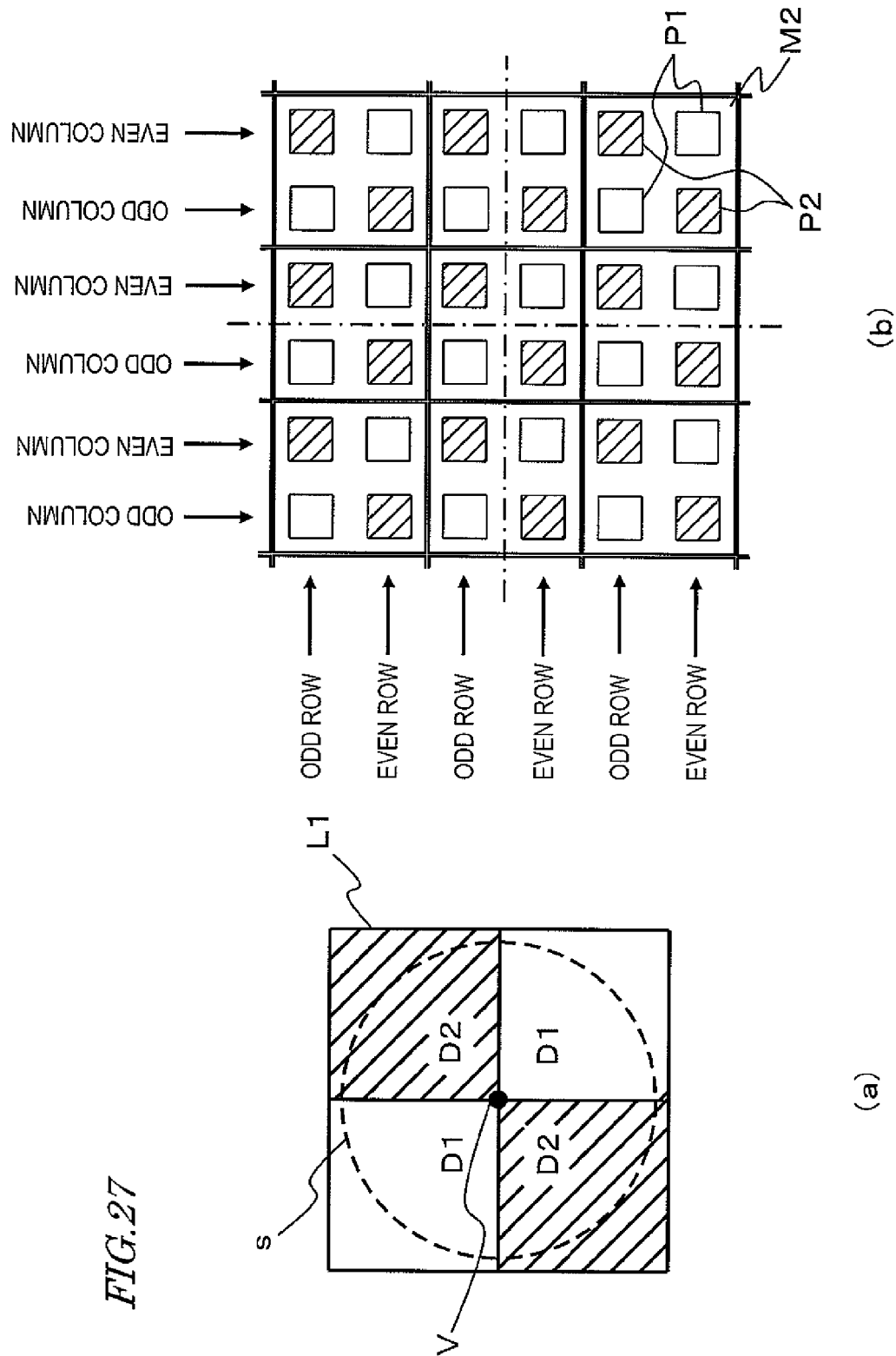
FIG. 27(a) is a front view of an optical element L1 according to a tenth embodiment of the present invention viewed from a subject side.
FIG. 27(b) is a diagram illustrating a positional relationship between an array-shaped optical element K and pixels on an imaging element N.

FIG. 27(a) is a front view of the optical element L1 viewed from the subject side. In FIG. 27(a), the optical element L1 is divided into four rotational symmetric areas (two optical plane areas D1 and two optical plane areas D2) about the optical axis V on a plane perpendicular to the optical axis of the lens optical system. The optical plane areas D1 and D2 are provided in an alternate manner so that the two optical plane areas D1 and the two optical plane areas D2 are not adjacent to each other. The two optical plane areas D1 have a point symmetric relationship about the optical axis (contact point). In the same manner, the two optical plane areas D2 have a point symmetric relationship about the optical axis (contact point).

FIG. 27(b) is a diagram illustrating a positional relationship between the array-shaped optical element K and pixels on the imaging element N. In the tenth embodiment, the light beam that has passed through the optical plane area D1 arrives at odd row and odd column and even row and even column, and therefore, in pixels corresponding to the optical element M2, a pixel value of the odd, row and odd column and a pixel value of the even row and even column are added. The light beam that has passed through the optical plane area D2 arrives at even row and odd column and odd row and even column, and therefore, in pixels corresponding to the optical element M2, a pixel value of the even row and odd column and a pixel value of the odd row and even column are added. An image is then generated from these added pixel values.

An effect obtained by this embodiment is described below comparing with the effect obtained by the first embodiment.

In the first embodiment, as illustrated in FIG. 2, the optical plane area D1 and the optical plane area D2 are divided as two areas having a semicircular shape, respectively. Therefore, a spot center of gravity of the light that has passed through each area on the image plane is changed depending on the subject distance, which may generate a positional deviation.

Figure 28:
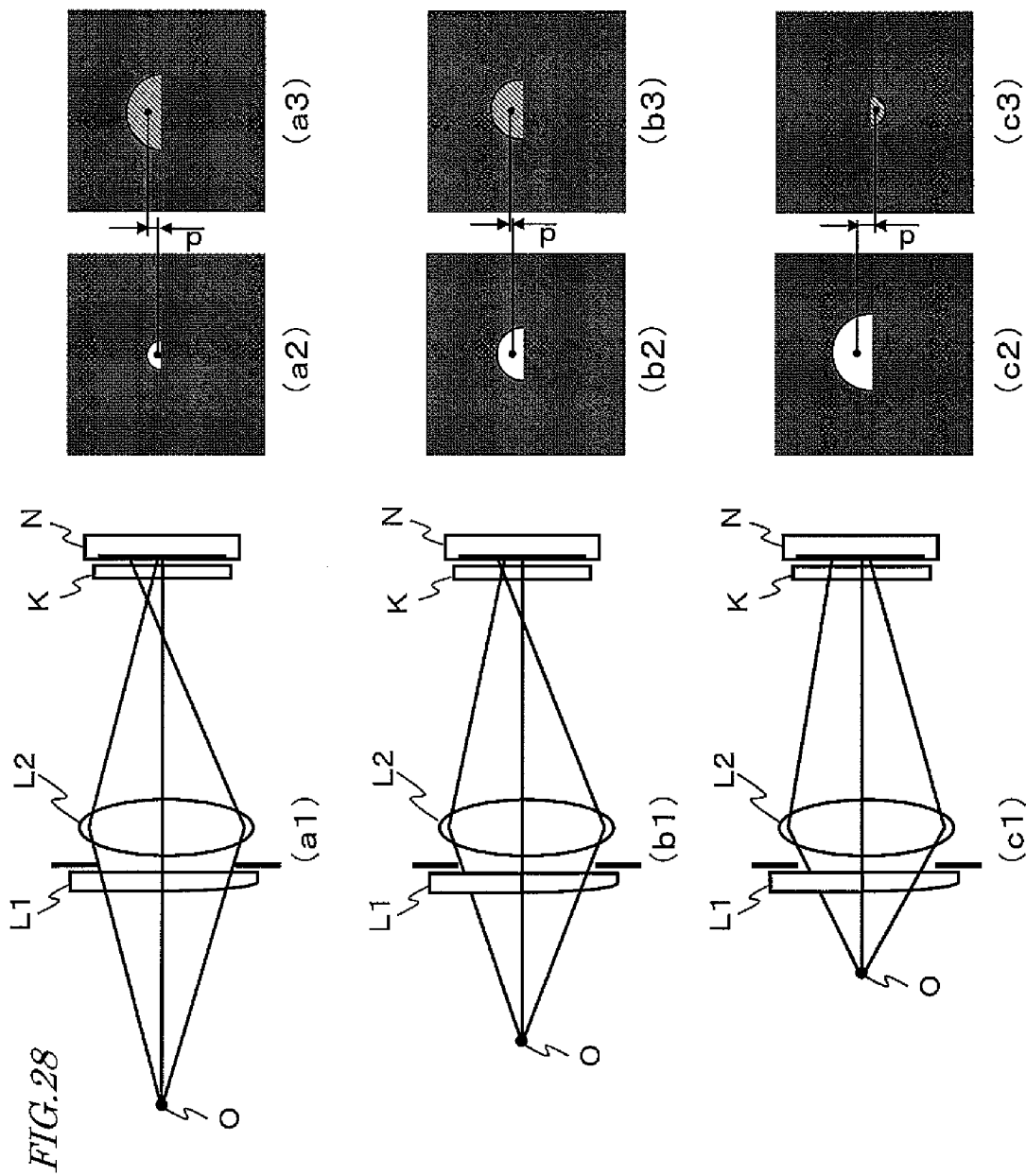
FIGS. 28(a1), 28(b1), and 28(c1) are light beam diagrams for each subject distance.

FIG. 28 are light beam diagrams for each subject distance when the optical plane area D1 is a planar surface and the optical plane area D2 is a spherical surface in the first embodiment and diagrams schematically illustrating a point image and a change of the center of gravity of the point image. FIGS. 28(a1), 28(b1), and 28(c1) are light beam diagrams for each subject distance. In FIGS. 28(a1), 28(b1), and 28(c1), an object point O is indicated as a subject. The same reference symbols in FIG. 28 as those in FIG. 1 are omitted herein. FIGS. 28(a2), 28(b2), and 28(c2) are diagrams schematically illustrating image information of point images obtained by the light of the object point O that has passed through the optical plane area D1 and arrived at the pixels of the odd row via the lenticular lens. FIGS. 28(a3), 28(b3), and 28(c3) illustrate image information of point images obtained by an image of the object point O that has passed through the optical plane area D2 and arrived at the pixels of the even row via the lenticular lens. In each piece of the image information, the image of the object point O has a semicircular shape. FIGS. 28(a2), 28(a3), 28(b2), 28(b3), 28(c2), and 28(c3) illustrate the center of gravity of illuminance (black spot) of respective images.

Each piece of the image information is schematically illustrated as information obtained by extending the image information extracted for each pixel of the odd row ((a2), (b2), and (c2)) and the image information extracted for each pixel of the even row ((a3), (b3), and (c3)) to double in the Y direction by an interpolating process.

As illustrated in FIG. 28, the spot diameter is changed depending on the position of the object point O (subject distance). The image information obtained by the light that has passed through each of the optical plane areas D1 and D2 produces a semicircular shape, and hence a distance d between the centers of gravity of the point images on the image information of the pixel of the odd row and the image information of the pixel of the even row differs depending on the position of the object point. When there exists the distance d between the centers of gravity, it is not desirable because it becomes a parallax (error in calculation of the sharpness of the image).

On the other hand, in the tenth embodiment, the optical plane areas D1 and D2 are arranged in a point symmetric manner about the optical axis, and therefore, the distance d between the centers of gravity of the point images is not changed even when the subject distance is changed.

FIG. 29 are diagrams schematically illustrating the point image and a change of the center of gravity of the point image for each subject distance in this embodiment. FIGS. 29(a1) and 29(a2), 29(b1) and 29(b2), and 29(c1) and 29(c2) illustrate the point image (illustrated as a semicircle) and the center of gravity of the point image (black spot) obtained by imaging the object point O via the microlens, respectively corresponding to the subject distance of the object point O illustrated in FIGS. 28(a1), 28(b1), and 28(c1).

FIGS. 29(a1), 29(b1), and 29(c1) illustrate image information of point images obtained by adding the pixel values of pixels of the odd row and odd column and pixels of the even row and even column. FIGS. 29(a2), 29(b2), and 29(c2) illustrate image information of point images obtained by adding the pixel values of pixels of the even row and odd column and pixels of the odd row and even column. As illustrated in FIG. 29, in the tenth embodiment, each point image has a shape in which sectors having a center angle of 90° are opposed to each other about the optical axis, and therefore, the distance d between the centers of gravity of the point images is always zero on the image information obtained by adding the pixels of the odd row and odd column and the even row and even column and the image information obtained by adding the pixels of the even row and odd column and the odd row and even column, and is not changed regardless of the subject distance.

In this manner, in the tenth embodiment, by arranging the optical plane areas D1 and D2 in a separate manner across the optical axis, it is possible to prevent the parallax from being generated in the acquired image even when the subject distance is changed. With this configuration, it is possible to suppress a degradation of the distance measurement accuracy due to the parallax.

(Other Embodiments)

In the first to tenth embodiments, the optical plane area is arranged on a plane of the optical element L1 on the subject side. However, the optical plane area can be arranged on a plane of the optical element L1 on the image side.

Further, although the lens L2 is configured as a single lens, the lens L2 can be configured as a plurality of lens units or a plurality of lenses.

Moreover, the plurality of optical plane areas can be formed on an optical plane of the lens L2 arranged near the stop.

Further, although the optical element L1 is arranged on the subject side with respect to the position of the stop, the optical element L1 can be arranged on the image side with respect to the position of the stop.

Figure 30:
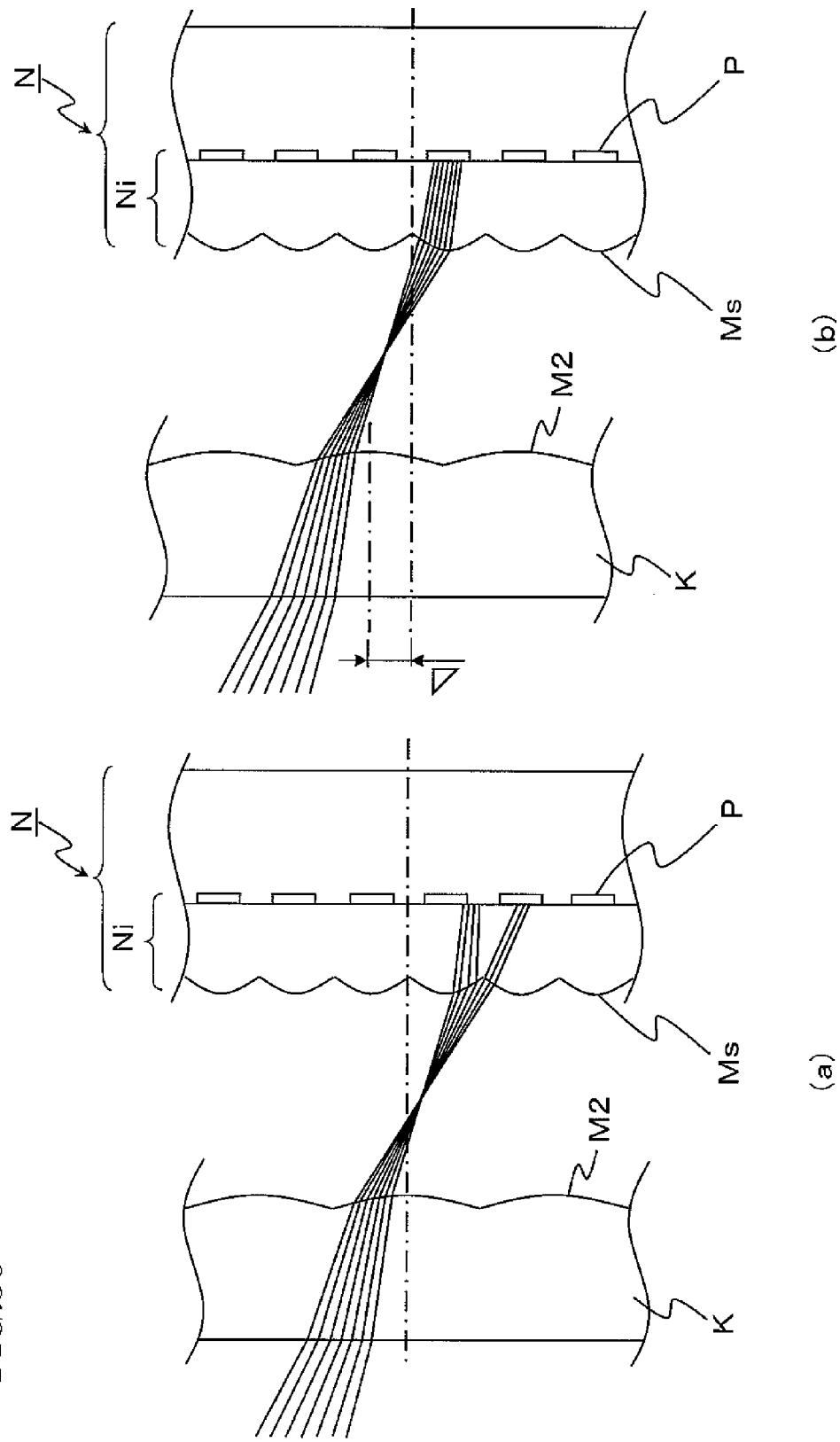
FIG. 30(a) is an enlarged diagram illustrating the vicinity of an imaging plane when a crosstalk is generated in the embodiments of the present invention.
FIG. 30(b) is an enlarged diagram illustrating the vicinity of the imaging plane when the crosstalk is reduced.

Moreover, in the above-mentioned first to tenth embodiments, the image-side telecentric optical system is used as the lens optical system L. However, an image-side non-telecentric optical system can be used instead. FIG. 30(a) is an enlarged diagram illustrating the vicinity of an imaging portion. In FIG. 30(a), only the light beam passing through one optical plane area among the light beams passing through the array-shaped optical element K is illustrated. As illustrated in FIG. 30(a), when the lens optical system L is a non-telecentric optical system, the light is leaked to the adjacent pixel so that a crosstalk is likely to be generated. However, the crosstalk can be reduced by offsetting the array-shaped optical element with respect to the pixel array by Δ as illustrated in FIG. 30(b). The incident angle is different depending on the image height, and hence the offset amount Δ can be set in accordance with the incident angle of the light beam on the imaging plane. In the case of using the image-side non-telecentric optical system, the incident angle of the light beam at the focal point of the optical system is uniquely determined by the position and the angle of view of the light beam passing through the stop S.

The first to tenth embodiments describe the image device including the first signal processing unit C1, the second signal processing unit C2, and the memory unit Me (illustrated in, for example, FIG. 1). The imaging device according to the present invention can be configured without these signal processing units and the memory unit. In such a case, the processes performed by the first signal processing unit C1 and the second signal processing unit C2 can be performed by using a PC or the like outside the imaging device. That is, the present invention can also be realized by a system including an imaging device including the lens optical system L, the array-shaped optical element K, and the imaging element N, and an external signal processing device.

In the distance measurement method according to the present invention, the correlation between the sharpness and the subject distance is not necessarily used. For example, the subject distance can be obtained by substituting obtained sharpness or contrast in an equation representing the relation between the sharpness or the contrast and the subject distance.

Further, it is preferred that each optical element (microlens) of the microlens array according to the second to tenth embodiments have a rotationally symmetric shape with respect to the optical axis. The reason is described below by comparing with a microlens having a rotationally asymmetric shape with respect to the optical axis.

FIG. 31(a1) is a perspective view of a microlens array having a rotationally asymmetric shape with respect to the optical axis. This type of microlens array can be formed by forming a resist of a rectangular columnar shape on an array, rounding corner portions of the resist by performing a thermal process, and patterning the resist. The contour of the microlens illustrated in FIG. 31(a1) is illustrated in FIG. 31(a2). In the microlens having a rotationally asymmetric shape, the curvature radiuses are different between longitudinal and lateral direction (direction parallel to four sides of the bottom surface of the microlens) and an oblique direction (diagonal direction of the bottom surface of the microlens).

FIG. 31(a3) is a diagram illustrating a result of a light-beam tracking simulation when the microlens illustrated in FIGS. 31(a1) and 31(a2) is applied to the array-shaped optical element according to the present invention. In FIG. 31(a3), although only the light beam passing through one optical plane area among the light beams passing through the array-shaped optical element K is illustrated, when a microlens having a rotationally asymmetric shape is used in this manner, the light is leaked to the adjacent pixel so that a crosstalk is generated.

FIG. 31(b1) is a perspective view of a microlens array having a rotationally symmetric shape with respect to the optical axis. This type of microlens having a rotationally symmetric shape can be formed on a glass plate or the like by a thermal imprint method or a UV imprint method.

FIG. 31(b2) illustrates the contour of the microlens having a rotationally symmetric shape. In the microlens having a rotationally symmetric shape, the curvature radius is the same in the longitudinal and lateral direction and in the oblique direction.

FIG. 31(b3) is a diagram illustrating a result of a light-beam tracking simulation when the microlens illustrated in FIGS. 31(b1) and 31(b2) is applied to the array-shaped optical element according to the present invention. In FIG. 31(b3), although only the light beam passing through one optical plane area among the light beams passing through the array-shaped optical element K is illustrated, it is found that there is no such crosstalk as illustrated in FIG. 31(a3). In this manner, by forming the microlens in a rotationally symmetric shape, the crosstalk can be reduced, and therefore, it is possible to suppress the degradation of the accuracy in the distance measurement operation.

INDUSTRIAL APPLICABILITY

The imaging device according to the present invention is suitable as an imaging device such as a digital still camera and a digital video camera. In addition, the imaging device according to the present invention can also be applied to a distance measurement device for monitoring surroundings and occupants of a vehicle and a distance measurement device for inputting three-dimensional information of a game console, a PC, a mobile terminal, and the like.

REFERENCE SIGNS LIST

A imaging device
L lens optical system
L1 optical element
L2 lens
D1, D2, D3, D4 optical plane area
S stop
K array-shaped optical element
N imaging element
Ni imaging plane
Me memory unit
Ms, Md microlens on imaging element
M1 lenticular lens of array-shaped optical element
M2 microlens (optical element) of array-shaped optical element
P1, P2, P3, P4, Pc, Pa, P light receiving element on imaging element
C1, C2 first and second signal processing unit
Q light shielding member

The invention claimed is:

1. An imaging device, comprising:
a lens optical system comprising at least a first area and a second area, the second area having an optical property that causes a focusing property of the second area to differ from a focusing property of the first area due to a light beam that has passed through the first area;
an imaging element comprising at least a plurality of first pixels and a plurality of second pixels which allow light that has passed through the lens optical system to enter; and
an array-shaped optical element that is arranged between the lens optical system and the imaging element and is configured to cause light that has passed through the first area to enter the plurality of first pixels and to cause light that has passed through the second area to enter the plurality of second pixels.

2. The imaging device according to claim 1, further comprising a signal processing unit,
wherein the signal processing unit calculates a distance to a subject by using brightness information of a first image obtained from the plurality of first pixels and a second image obtained from the plurality of second pixels.

3. The imaging device according to claim 2, wherein:
when the subject distance is within a predetermined range, a value of a ratio of a sharpness of an image formed by the light that has entered the first area and a sharpness of an image formed by the light that has entered the second area has a correlation with the subject distance; and
the signal processing unit calculates the distance to the subject based on the correlation and the ratio of the sharpness of the first image and the sharpness of the second image.

4. The imaging device according to claim 3, wherein when the subject distance is within the predetermined range, the sharpness of the image formed by the light that has entered the first area is substantially constant, and the sharpness of the image formed by the light that has entered the second area is changed in accordance with the distance to the subject.

5. The imaging device according to claim 2, wherein:
when the subject distance is within a predetermined range, a ratio of a contrast of an image formed by the light that has entered the first area and a contrast of an image formed by the light that has entered the second area has a correlation with the subject distance; and
the signal processing unit calculates the distance to the subject based on the correlation, the contrast of the first image, and the contrast of the second image.

6. The imaging device according to claim 1, wherein the first area and the second area have curvature radiuses different from each other.

7. The imaging device according to claim 1, wherein the first area and the second area comprises areas divided with an optical axis of the lens optical system as a boundary center.

8. The imaging device according to claim 1, wherein:
the first area comprises a plurality of first area forming portions arranged in a point symmetric manner across the optical axis of the lens optical system; and
the second area comprises a plurality of second area forming portions arranged in a point symmetric manner across the optical axis of the lens optical system.

9. The imaging device according to claim 2, wherein:
the lens optical system further comprises at least a third area other than the first area and the second area;
the array-shaped optical element is configured to cause light beams that have passed through the third area to enter a third pixel other than the plurality of first pixels and the plurality of second pixels; and
the signal processing unit calculates the distance to the subject by using brightness information of an image obtained from the third pixel.

10. The imaging device according to claim 1, wherein the first area and the second area comprise are areas divided in a concentric circular shape about an optical axis of the lens optical system.

11. The imaging device according to claim 2, wherein the signal processing unit calculates the distance to the subject by using brightness information of an image obtained by adding the first image and the second image and the brightness information of the first image or the second image.

12. The imaging device according to claim 1, wherein:
the first area comprises a varifocal lens; and
the varifocal lens is controlled so that a focal length is continuously changed during an exposing time.

13. The imaging device according to claim 1, wherein the lens optical system comprises an image-side telecentric optical system.

14. The imaging device according to claim 2, further comprising a conversion unit that converts, when a magnification of the first image and a magnification of the second image differ from each other, the first image and the second image into images in which the magnification of the first image and the magnification of the second image are corrected to be substantially equal to each other.

15. The imaging device according to claim 1, wherein:
the lens optical system comprises an image-side non-telecentric optical system; and
an arrangement of the array-shaped optical element is offset with respect to an arrangement of pixels of the imaging element outside the optical axis of the lens optical system.

16. The imaging device according to claim 1, wherein the first area and the second area have substantially the same dimension.

17. The imaging device according to claim 1, wherein the array-shaped optical element comprises a lenticular lens or a microlens array.

18. The imaging device according to claim 1, wherein:
the array-shaped optical element comprises a microlens array,
the microlens array comprises a plurality of optical elements;
each of the plurality of optical elements corresponds to at least one of the plurality of first pixels and at least one of the plurality of second pixels; and
the each of the plurality of optical elements has a rotationally symmetric shape with respect to the optical axis.

19. The imaging device according to claim 1, wherein the array-shaped optical element is formed on the imaging element.

20. The imaging device according to claim 19, further comprising a microlens provided between the array-shaped optical element and the imaging element,
wherein the array-shaped optical element is formed on the imaging element via the microlens.

21. The imaging device according to claim 1, wherein the plurality of first pixels and the plurality of second pixels respectively comprise filters for transmitting light beams of different wavelength bands.

22. The imaging device according to claim 21, wherein:
the array-shaped optical element comprises a plurality of optical elements;
each of the plurality of optical elements corresponds to at least one of the plurality of first pixels and at least one of the plurality of second pixels; and
a pixel corresponding to the each of the plurality of optical elements comprises a filter for transmitting light beams of the same wavelength band.

23. The imaging device according to claim 21, further comprising a signal processing unit that calculates a distance to a subject by using brightness information of a first image obtained from the plurality of first pixels and a second image obtained from the plurality of second pixels, wherein:
the first area and the second area in the lens optical system have predetermined on-axis chromatic aberrations with different imaging positions for a first color and a second color;
when the subject distance is within a first distance range, the signal processing unit calculates the distance to the subject by using brightness information of the first color; and
when the subject distance is within a second distance range that is different from the first distance range, the signal processing unit calculates the distance to the subject by using brightness information of the second color.

24. The imaging device according to claim 1, further comprising a light shielding member provided at a boundary portion between the first area and the second area.

25. The imaging device according to claim 1, wherein:
the lens optical system further comprises a stop; and
the first area and the second area are arranged near the stop.

26. The imaging device according to claim 1, wherein the plurality of first pixels and the plurality of second pixels are adjacent to each other.

27. The imaging device according to claim 1, wherein the plurality of first pixels and the plurality of second pixels are arranged in an alternate manner.

28. The imaging device according to claim 1, wherein:
the plurality of first pixels and the plurality of second pixels are arranged in a row in a lateral direction; and
the plurality of first pixels and the plurality of second pixels are arranged in an alternate manner in a longitudinal direction.

29. The imaging device according to claim 28, wherein:
the array-shaped optical element comprises a lenticular lens;
the lenticular lens comprises a plurality of optical elements elongated in the lateral direction and arranged in the longitudinal direction; and
each of the plurality of optical elements is arranged to correspond to pixels of two rows including one row of the plurality of first pixels and one row of the plurality of second pixels.

30. An imaging system, comprising:
the imaging device according to claim 1; and
a signal processing device that calculates a distance to a subject by using brightness information of a first image obtained from the plurality of first pixels and a second image obtained from the plurality of second pixels in the imaging device.

31. An imaging method using an imaging device, the imaging device comprising:
a lens optical system comprising at least a first area and a second area, the second area having an optical property that causes a focusing property of the second area to differ from a focusing property of the first area due to a light beam that has passed through the first area;
an imaging element comprising at least a plurality of first pixels and a plurality of second pixels which allow light that has passed through the lens optical system to enter; and
an array-shaped optical element that is arranged between the lens optical system and the imaging element,
the imaging method comprising:
causing, by the array-shaped optical element, light that has passed through the first area to enter the plurality of first pixels and light that has passed through the second area to enter the plurality of second pixels; and
calculating a distance to a subject by using brightness information of a first image obtained from the plurality of first pixels and a second image obtained from the plurality of second pixels.

32. The imaging method according to claim 31, wherein:
the lens optical system further comprises a stop; and
the first area and the second area are arranged near the stop.

33. The imaging method according to claim 31, wherein the plurality of first pixels and the plurality of second pixels are adjacent to each other.

34. The imaging method according to claim 31, wherein the plurality of first pixels and the plurality of second pixels are arranged in an alternate manner.

35. The imaging method according to claim 31, wherein:
the plurality of first pixels and the plurality of second pixels are arranged in a row in a lateral direction; and
the plurality of first pixels and the plurality of second pixels are arranged in an alternate manner in a longitudinal direction.

36. The imaging method according to claim 35, wherein:
the array-shaped optical element comprises a lenticular lens;
the lenticular lens comprises a plurality of optical elements elongated in the lateral direction and arranged in the longitudinal direction; and
each of the plurality of optical elements is arranged to correspond to pixels of two rows including one row of the plurality of first pixels and one row of the plurality of second pixels.

* * * * *